United States Patent [19]

Oba et al.

[11] Patent Number: 5,303,147
[45] Date of Patent: Apr. 12, 1994

[54] COMPUTER AIDED PLANNING METHOD AND SYSTEM

[75] Inventors: Michiko Oba, Ikeda; Norihisa Komoda, Kawasaki; Kazuhiro Kawashima, Yokohama, all of Japan

[73] Assignee: Hitachi, Ltd., Tokyo, Japan

[21] Appl. No.: 586,792

[22] Filed: Sep. 24, 1990

[30] Foreign Application Priority Data

Sep. 27, 1989 [JP] Japan .................................. 1-249134

[51] Int. Cl.⁵ ...................... G05F 15/20; G05F 15/46; G06G 7/48; G06G 7/64
[52] U.S. Cl. .................................. 364/402; 364/401; 364/468
[58] Field of Search ............... 364/401, 402, 403, 419, 364/468, 478

[56] References Cited

U.S. PATENT DOCUMENTS

| | | | |
|---|---|---|---|
| 4,710,763 | 12/1987 | Franke et al. ..................... | 340/723 |
| 4,839,803 | 6/1989 | Kawashima et al. ............... | 364/403 |
| 4,868,779 | 9/1989 | Seto ..................................... | 364/419 |
| 4,896,269 | 1/1990 | Tong .................................... | 364/468 |
| 4,965,741 | 10/1990 | Winchell et al. ..................... | 395/12 |
| 5,119,318 | 6/1992 | Paradies et al. ..................... | 395/61 |

OTHER PUBLICATIONS

Numao, et al., "Scheduling Assistant Editor", IBM Japan, Information Processing Society of Japan, The 35th National Conference, pp. 1647–1648. (English translation unavailable).

Primary Examiner—Roy N. Envall, Jr.
Assistant Examiner—Stephen R. Tkacs
Attorney, Agent, or Firm—Fay, Sharpe, Beall, Fagan, Minnich & McKee

[57] ABSTRACT

A planning method by computer support is based on a planning program using data concerning an object to be planned and data necessary for planning. The planning method comprises the steps of reading out of a memory various kinds of data concerning the object to be planned; preparing a plan by using the data in accordance with the planning program; delivering results of the prepared plan; inputting definition data for an explaining statement concerning the planning results and data concerning an output form of the explaining statement; processing the planning results on the basis of the definition data for the explaining statement and the data concerning the output form to prepare an explaining statement concerning the planning results; and delivering the prepared explaining statement.

21 Claims, 38 Drawing Sheets

F I G. 3
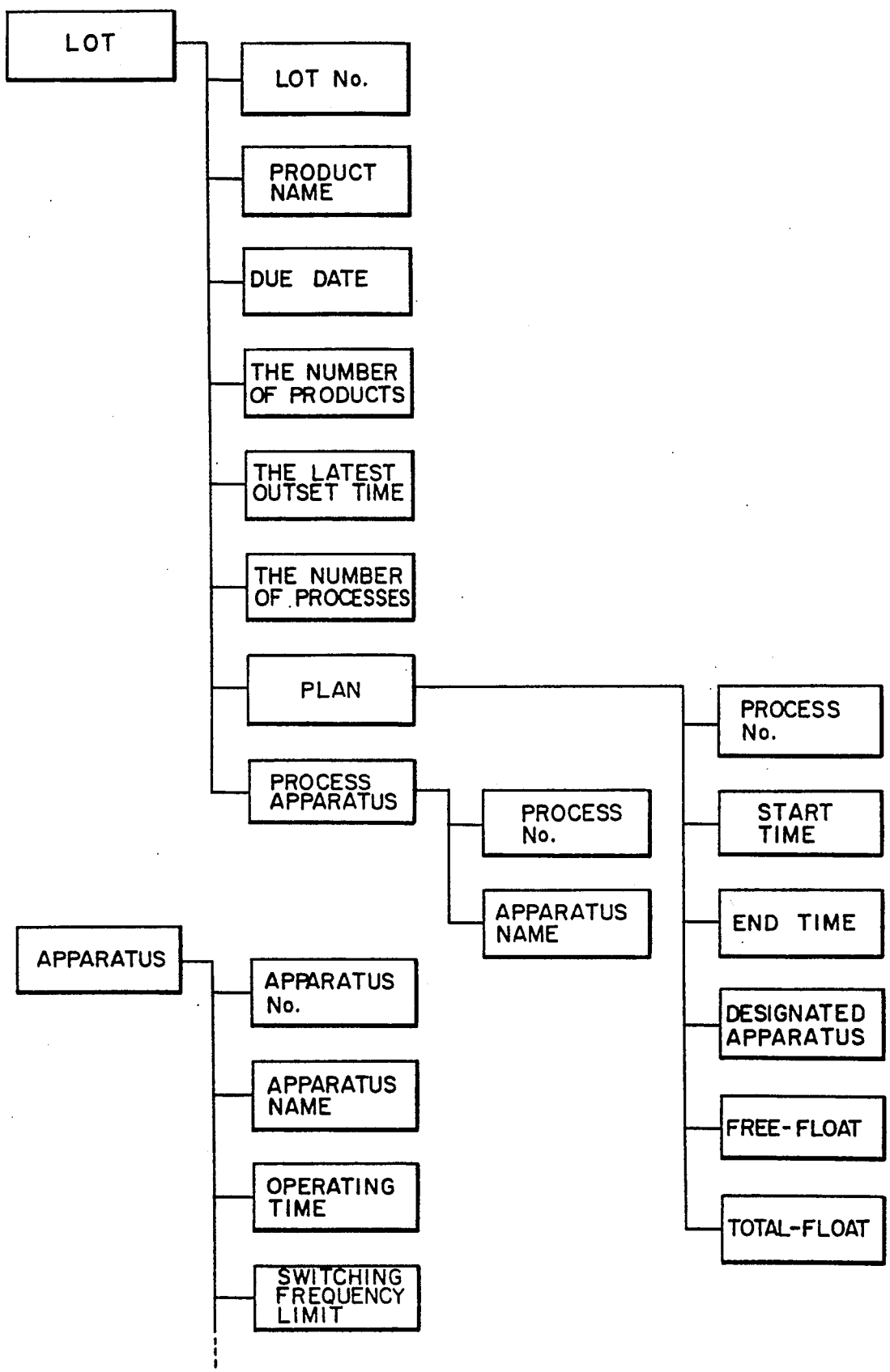

FIG. 4

LOT

| LOT No. | PRODUCT NAME | PRODUCT NUMBER | THE EARLIEST OUTSET TIME | DUE DATE |
|---|---|---|---|---|
| 1 | a1 | 120 | 0 | 3600 |
| 2 | a2 | 100 | 1200 | 3600 |
| 3 | a3 | 90 | 0 | 2400 |
| ⋮ | ⋮ | ⋮ | ⋮ | ⋮ |
| 7 | b1 | 120 | 2400 | 3600 |
| 8 | b2 | 150 | 0 | 2400 |
| ⋮ | ⋮ | ⋮ | ⋮ | ⋮ |

FIG. 5

APPARATUS

| APPARATUS No. | APPARATUS NAME | OPERATING TIME | SWITCHING FREQUENCY LIMIT | THROUGHPUT |
|---|---|---|---|---|
| 1 | A1 | 1200 | 4 | 2 |
| 2 | A2 | 1200 | 4 | 2 |
| 3 | B1 | 1000 | 5 | 1 |
| ⋮ | ⋮ | ⋮ | ⋮ | |

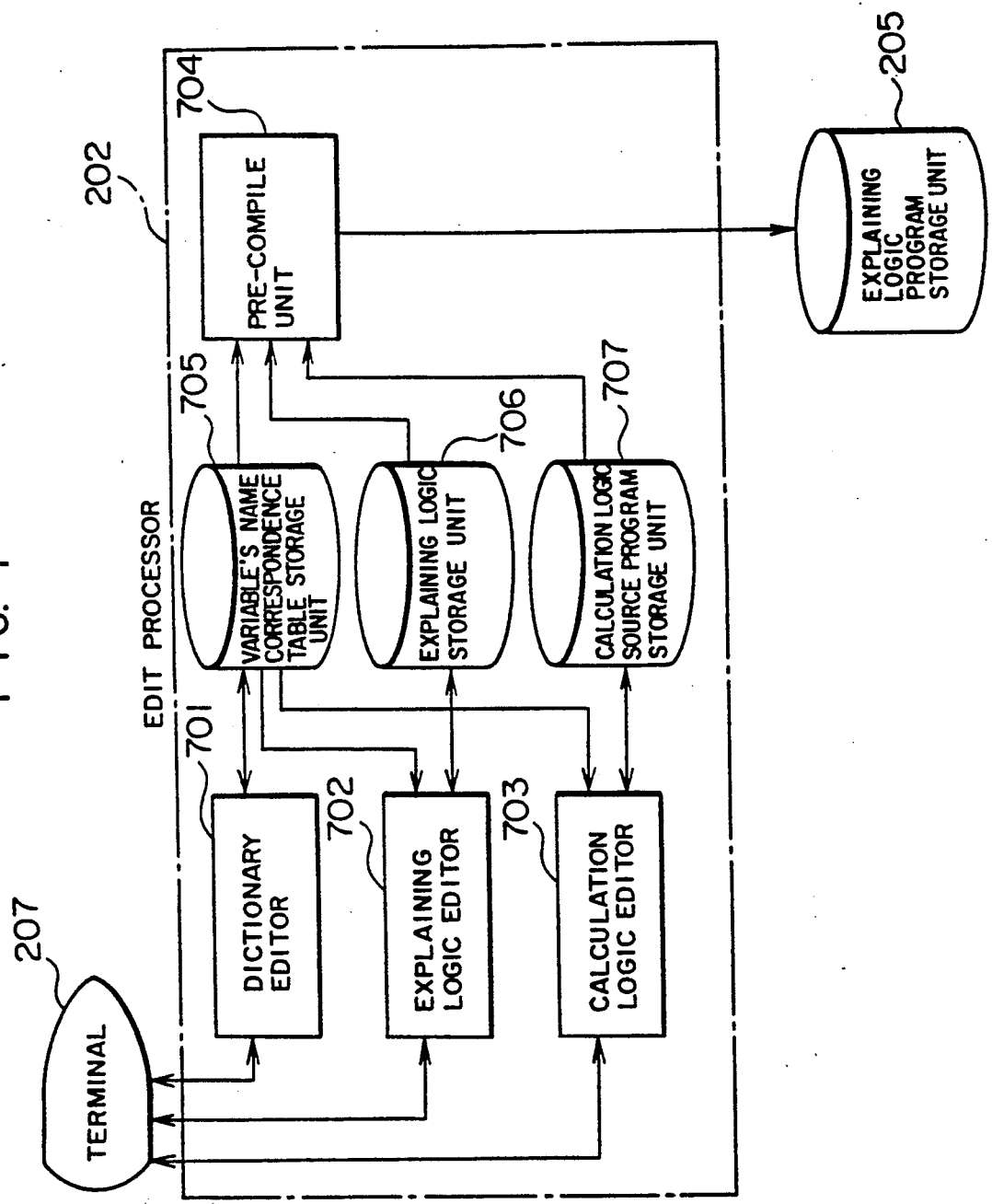

FIG. 8

| CLASSIFICATION | | TECHNICAL TERM | CODE NAME | ATTRIBUTE | REGION |
|---|---|---|---|---|---|
| PROCESS DATA GENERIC NAME | | LOT | LOT | FILE | 100 CASES |
| | ITEM | LOT No. | L-No | INTEGER | 4 DIGITS |
| | | PRODUCT NAME | L-SEIHIN | CHARACTER | 8 CHARACTER |
| | | DUE DATE | L-DUE | INTEGER | 4 DIGITS |
| | | THE NUMBER OF PRODUCTS | L-PRONO | INTEGER | 4 DIGITS |
| | | THE LATEST OUTSET TIME | L-CHAKU | INTEGER | 4 DIGITS |
| | | THE NUMBER OF PROCESSES | L-KOTEINO | INTEGER | 4 DIGITS |
| | SUBORDINATE ITEM | PLAN | KEKKA | pointer | |
| | | PROCESS APPARATUS | SYORI | pointer | |
| SUBORDINATE DATA GENERIC NAME | | PLAN | KEKKA | FILE | 10 CASES |
| | ITEM | PROCESS No. | K-KOTEI | INTEGER | 4 DIGITS |
| | | START TIME | K-START | INTEGER | 4 DIGITS |
| | | END TIME | K-END | INTEGER | 4 DIGITS |
| | | DESIGNATED APPARATUS | K-SOUTI | CHARACTER | 8 CHARACTER |
| | | FREE-FLOAT | K-FFLOAT | INTEGER | 4 DIGITS |
| | | TOTAL-FLOAT | K-TFLOAT | INTEGER | 4 DIGITS |
| SUBORDINATE DATA GENERIC NAME | | PROCESS APPARATUS | SYORI | FILE | 10 CASES |
| | ITEM | PROCESS No. | S-KOTEI | INTEGER | 4 DIGITS |
| | | APPARATUS NAME | S-SOUTI | CHARACTER | 8 CHARACTER |
| OBJECT DATA GENERIC NAME | | APPARATUS | SOUTI | FILE | 20 CASES |
| | ITEM | APPARATUS No | S-No | INTEGER | 4 DIGITS |
| | | APPARATUS NAME | S-NAME | CHARACTER | 8 CHARACTER |
| | | OPERATING TIME | S-KADOU | INTEGER | 4 DIGITS |
| | | SWITCHING FREQUENCY LIMIT | S-KIRI | INTEGER | 4 DIGITS |
| | | PROCESS CAPACITY | S-NORYOKU | INTEGER | 4 DIGITS |

FIG. 9

EXPLAINING OBJECT DATA DEFINITION

| TECHNICAL TERM | CODE NAME | ATTRIBUTE | REGION |
|---|---|---|---|
| OBJECT TYPE | T-SYUBETU | CHARACTER | 10 CHARACTERS |
| OBJECT LOT # | T-L-NO | INTEGER | 4 DIGITS |
| OBJECT PROCESS # | T-KOTEI-NO | INTEGER | 4 DIGITS |
| OBJECT APPARATUS # | T-SOUTI | INTEGER | 4 DIGITS |

CALCULATION LOGIC SOURCE PROGRAM NAME DEFINITION

| TECHNICAL TERM | CALCULATION LOGIC SOURCE PROGRAM NAME |
|---|---|
| PROCESS TIME | F 1 |
| ⋮ | ⋮ |
| START PROGRAM 1 | P 1 |
| START PROGRAM 2 | P 2 |
| ⋮ | ⋮ |

FIG. 10

```
explain block ;                                                          ~1001
  for (x) where
    x is OBJECT LOT#, y is OBJECT PROCESS#, z is OBJECT APPARATUS#;      ~1002
  definition;
    $job     = PRODUCT NAME (x);
    $jobsq   = OBJECT PROCESS # ;
    $est     = THE EARILEST OUTSET TIME(x);
    $nouki   = DUE DATE (x);                                             ~1003
    $machine = PROCESS APPARATUS (x,y);
    $ass-m   = DESIGNATED APPARATUS(x,y);
    $s-time  = PROCESS TIME (x,y);
  end definition;

logic;
    if (OBJECT TYPE .EQ "JOB")
    then display (JOB EXPLANATION START)
    if (OBJECT TYPE .EQ "JOB" .AND. OBJECT PROCESS# .EQ. 1               ~1004
        .AND. START TIME(x,y) .EQ. 0)
    then display (EXPLANATION 1 OF JOB)
  end logic;

expression (JOB EXPLANATION START)
    "OBJECT PROCESS: $ JOB sq %-TH PROCESS ¥n¥n OF PRODUCT NAME $ JOB %s"
    "THE EARILEST OUTSET TIME OF JOB $ JOB %s IS $ est %d. ¥n"           ~1005
    "THE TIME LIMIT OF DELIVERY OF JOB $ JOB %s IS $nouki %d. ¥n"

expression (EXPLANATION 1 OF JOB)
    "APPARATUS CAPABLE OF PROCESSING JOB $ JOB % s IS ($ MACHINE % s ). ¥n"
    "PROCESS TIME IS $S-TIME %d. ¥n"
    "JOB $ JOB % s HAS NO FREE-FLOAT, AND IS ¥n"                         ~1006
    "ALLOTMENT IS DONE TO STATE $ass m%s IN WHICH ONE OF APPARATUS CAPABLE
     OF PROCESSING BECOMES UNOCCUPIED EARLIEST ¥n, ¥n¥n"

expression (EXPLANATION 2 OF JOB)                                      ~1007
  end expression;
end block ;                                                              ~1008
```

FIG. 11

```
#include "head.h"
F1(&s-time);
int s-time;
{ s-time = LOT(T-L-NO).L-PRONO * SOUTI(T-L-NO).S-NOUYOKU;

| No. | CONDITION STATEMENT | OUTPUT EXPLAINING STATEMENT JAPANESE NAMES |
|-----|---------------------|---------------------------------------------|
| 1 | OBJECT TYPE. EQ. "JOB" | JOB EXPLANATION START |
| 2 | OBJECT TYPE. EQ. "JOB" AND OBJECT PROCES #. EQ. 1 AND START TIME (X,Y). EQ. 0 | EXPLANATION 1 OF JOB |
| .. | .. | .. |

FIG. 16 — 1207

| No. | OUTPUT FORM | OUTPUT VARIABLE | |
|-----|-------------|-----------------|---|
| | | DEFINITION VARIABLE'S NAME 1 | DEFINITION VARIABLE'S NAME 2 |
| 1 | "OBJECT PROCESS: $ JOB SQ %-TH PROCESS ¥n ¥n OF PRODUCT NAME $ JOB %s" | $job | $jobsq |
| 2 | "THE EARLIEST OUTSET TIME OF JOB $ JOB %s IS $ EST %d ¥n" | $job | $est |
| 3 | "THE TIME LIMIT OF DELIVERY OF JOB $ JOB %s IS $ NOUKI %d. ¥n" | $nouki | .. |
| .. | .. | .. | .. |

FIG. 13

AFFIX REGISTRATION TABLE — 1301

| AFFIX | TECHNICAL TERM | CODE NAME |
|---|---|---|
| x | OBJECT LOT # | T-L-NO |
| y | OBJECT PROCESS # | T-KOTEI |
| z | OBJECT APPARATUS # | T-SOUTI |

VARIABLE REGISTRATION TABLE — 1302

| DEFINITION VARIABLE'S NAME | TECHNICAL TERM | CODE NAME | | AFFIX ENGLISH VARIABLE'S NAME | | CALCULATION LOGIC SOURCE PROGRAM NAME |
|---|---|---|---|---|---|---|
| | | NAME | ITEM | 1 | 2 | |
| $job | PRODUCT NAME | LOT | L-SEIHIN | T-L-NO | | |
| $jobsq | OBJECT PROCESS # | | T-KOTEI | | | |
| $est | THE EARLIEST OUTSET TIME | LOT | L-CHAKU | T-L-NO | | |
| $nouki | DUE DATE | LOT | L-DUE | T-L-NO | | |
| $machine | APPARATUS CAPABLE OF PROCESSING | | | | | F1 |
| $ass-m | DESIGNATED APPARATUS | KEKKA | SOUTI | T-L-NO | T-KOTEI | |
| ⋮ | ⋮ | ⋮ | ⋮ | ⋮ | | |
| | OBJECT TYPE | | T-SYUBETU | | | |
| | START TIME | KEKKA | START | T-L-NO | T-KOTEI | |
| ⋮ | ⋮ | | | | | |

EXPLAINING STATEMENT NAME REGISTRATION TABLE — 1303

| EXPLAINING STATEMENT JAPANESE NAME | EXPLAINING STATEMENT ENGLISH NAME | EXPLAINING STATEMENT START LINE No. | EXPLAINING STATEMENT END LINE No. |
|---|---|---|---|
| JOB EXPLANATION START | E1 | 1 | 3 |
| EXPLANATION 1 OF JOB | E2 | 4 | 7 |
| EXPLANATION 1 OF JOB | E3 | 8 | 10 |
| | | ⋮ | ⋮ |

FIG. 17

```
#include "head.h"
setumei (fpout)
   FILE fpout;
   {
      if (strcmp(T_SYUBETU, "JOB")==0)
      { E1(fpout);
      }
      if (strcmp(T_STUBETU, "JOB")==0) && T_KOUTEI_NO==1
         && KEKKA(T_L_NO).KOTEI(T_KOTEI).START==0)
      { E2(pout);
      }

}
E1(fpout)
   FILE fpout;
   {
      fprintf(fpout,"OBJECT PROCESS: S JOB SQ %-TH PROCESS ¥n¥n OF PRODUCT
            LOT(T_L_NO).L_SEIHIN, T_KOUTEI);      NAME $ JOB %s"
      fprintf(fpout,"THE EARLIEST OUTSET DAY OF JOB S JOB %s IS $ EST %d. ¥n"
            LOT(T_L_NO).L_SEIHIN, LOT(T_L_NO).L_CHAKU);
      fprintf(fpout, "THE TIME LIMIT OF DELIVERY OF JOB $ JOB %s IS $nouki %d. ¥n"
            LOT(T_L_NO).L_DUE);
   }
E2(fpout)
   FILE fpout;
   {
      int s_time;
      F1(& s_time);
      fprintf(fpout,"APPARATUS CAPABLE OF PROCESSING JOB $ JOB %s IS($machine%s) ¥n"
         LOT(T_L_NO).L_SEIHIN, LOT(T_L_NO).SYORI(T_KOTEI).S_SOUTI);
      fprintf(fpout,"PROCESS TIME IS $ S-TIME %d. ¥n"
      fprintf(fpout,"DELIVERY OF JOB $ JOB %s HAS NO SPARE TIME AND IS ¥n"
         LOT(T_L_NO).L_SEIHIN);
      fprintf(fpout,"ALLOTMENT IS DONE TO STATE $asc-m%S IN WHICH"
      fprintf(fpout,"ONE OF APPARATUS CAPABLE OF PROCESSING BECOME UNOCCUPIED
                                                               EARLIEST ¥n,¥n"
            KEKKA(T_L_NO).KOTEI(T_KOTEI).SOUTI);
   }
```

FIG. 19

191 SCHEDULE RESULTS

| DATE | 1 | | | | |
|---|---|---|---|---|---|
| APPARATUS A1 | a3 | c1 | c4 | d2 | d5 |
| APPARATUS A2 | a4 | a1 | c2 | | |
| APPARATUS B1 | | a3 | a1 | | |
| APPARATUS B2 | | a4 | | | |
| APPARATUS C1 | | a3 a4 | a1 | | |
| APPARATUS C2 | | | c4 | | |
| APPARATUS D1 | | | | d2 | |

192 EXPLANATION

OBJECT PROCESS: FIRST PROCESS OF PRODUCT NAME a3. THE EARLIEST OUTSET DATE OF JOB a3 IS THE FIRST DAY. THE DUE DATE a3 IS THE THIRD DAY
APPARATUS CAPABLE OF PROCESSING JOB a3 ARE (A1,A2). THE DUE DATE a3 HAS SPARE TIME AND THEREFORE ANOTHER JOB, THE DELIVERY OF WHICH HAS NO SPARE TIME, IS PROCESSED PREFERENTIALLY AND ALLOTTED TO A2 OF APPARATUS CAPABLE OF PROCESSING WHICH BECOMES UNOCCUPIED EARLIEST. AT PRESENT, ALLOTMENT IS SUCH THAT START TIME IS 7:00 OF THE FIRST DAY AND END TIME IS 11:00 OF THE FIRST DAY.

193 SCHEDULE RESULTS

| DATE | 1 | | | | |
|---|---|---|---|---|---|
| APPARATUS A1 | a3 | c1 | c4 | d2 | d5 |
| APPARATUS A2 | a4 | a1 | c2 | | |
| APPARATUS B1 | | a3 | a1 | | |
| APPARATUS B2 | | a4 | | | |
| APPARATUS C1 | | a3 a4 | a1 | | |
| APPARATUS C2 | | | c4 | | |
| APPARATUS D1 | | | | d2 | |

194 EXPLANATION

OBJECT APPARATUS: A1
THE OPERATING RATE OF APPARATUS A1 IS 95%. THE SWITCHING TIME OF APPARATUS A1 IS 20 MINUTES. THE UPPER LIMIT OF SWITCHING FREQUENCY OF APPARATUS A1 IS 5.
ALLOTTED TO APPARATUS A1 ARE PRODUCTS:
DUE DATE OF WHICH HAS LESS SPARE TIME: a3, C4, d
HAVING MANY REMAINING PROCESSES: a3,C1,C4
CONSUMING MUCH PROCESS TIME: C1, d5

FIG. 25

```
block (PROCESS TIME);

for (x, y) is where x is OBJECT LOT # y is OBJECT APPARATUS #;

logic;

PROCESS TIME (x,y) = NUMBER OF PRODUCTS * PROCESS
        CAPACITY (y);

end logic;

end block;
```

FIG. 29

```
explain block;
    for (x) where definition;
        $job     = PRODUCT NAME (x);
        $jobsq   = OBJECT PROCESS #;
        $est     = THE LATEST OUTSET TIME (x);
        $nouki   = DUE DATE (x);
        $machine = PROCESS APPARATUS (x,y);
        $ass-m   = DESIGNATED APPARATUS (x,y);
        $s-time  = PROCESS TIME (x,y);

end definition;

logic;
        if (OBJECT TYPE.EQ."JOB")
        then display (JOB EXPLANATION START)
            call (START PROGRAM 1);
        if (OBJECT TYPE.EQ."JOB" AND OBJECT PROCESS #.EQ.1
            .AND. START TIME (x,y).EQ.0)
        then display (EXPLANATION 1 OF JOB)
            call (START PROGRAM 2);
                :
    end logic;

end expression;
end block;
```

FIG. 30

| No. | CONDITION, STATEMENT | OUTPUT EXPLAINING STATEMENT JAPANESE NAME | START PROGRAM NAME |
|---|---|---|---|
| 1 | OBJECT TYPE.EQ."JOB" | START OF EXPLANATION OF JOB | P1 |
| 2 | OBJECT TYPE.EQ."JOB". AND. OBJECT PROCESS #.EQ.1. AND. START TIME (x,y).EQ.0 | EXPLANATION OF JOB 1 | P2 |
| | : | : | : |

FIG. 36

| OUTPUT FORM | OUTPUT VARIABLE DEFINITION |
|---|---|
| "OBJECT PROCESS : PRODUCT NAME % S ¥n" | LOT(i).L-SEIHIN |
| "THE EARLIEST OUTSET POSSIBLE DATE IS % d DAY" | LOT(i).L-CHAKU |
| "DUE DATE IS % d DAY" | LOT(i).L-DUE |
| "AT PRESENT, THE FIRST PROCESS. IS FOR % d TO ¥n" | f-start(i); |
| "ALLOTTED TO % d. ¥n" | f-end(i); |
| "SPARE TIME PRECEDING DUE DATE IS % d. ¥n" | f-yoyuu(i); |
| --- | --- |

COMPUTER AIDED PLANNING METHOD AND SYSTEM

BACKGROUND OF THE INVENTION

The present invention relates to a planning support for preparing a plan in various kinds of business planning by utilizing a computer and more particularly, to a planning support method and system suitable for handling sophisticated problems in which various substitutive plans can be conceived.

In recent years, various methods have been proposed for dealing with planning problems by using a computer. The planning problem is a problem of combination in which various substitutive plans are conceivable and therefore materials are needed for deciding the quality (allowance or rejection) of planning results.

As discussed in Information Processing Society of Japan, No. 35 Nation-wide Conference Lecture Preliminary Papers, pp. 1647–1648, when a conventional planning support method (thereinafter referred to as a first prior art) is applied to preparation of a schedule of production line in planning business section of a factory, the results of the prepared schedule, ultimately evaluated in terms of average lead time or utilization efficiency of machine, are delivered for display to an operator concurrently with a diagram.

On the other hand, a conventional expert system constructing tool (hereinafter referred to as a second prior art) has the function of explaining to the user the process of deduction, thereby permitting the user to know grounds and reasons for conclusion provided by the system. The explaining function realized in the conventional expert system constructing tool is to indicate a chain of applied rules.

The conventional planning method by or based on computer support fails to extract and deliver desired information from a series of completed plans and to provide explaining information for evaluating the quality (allowance or rejection) of plans. Accordingly, the conventional method faces difficulties in deciding whether the completed plan is appropriate and in obtaining decision materials necessary for proper modification of the plan.

Since the planning problem is not a problem of preparing plan results through a mere syllogism, the second prior art which merely indicates a chain of rules has difficulties in grasping the quality of the planning results and the behavior of the system in course of planning.

The first prior art merely displays ultimate evaluation values of the planning results and fails to take into consideration showing grounds for conclusion that present allotments are selected from various conceivable substitutive plans, facing difficulties in accurately deciding the quality (allowance or rejection) of the planning results.

SUMMARY OF THE INVENTION

The present invention contemplates elimination of the above problems and has for its object to provide a planning support method and a system realizing the same which can display desiredly information concerning a planning procedure and planning results, i.e., information indicative of grounds for the planning results in planning various kinds of plans to facilitate evaluation such as corroboration of the quality and propriety of the planning results, thus making it possible to deal with changing of plans with flexibility and accuracy.

To accomplish the above object, there are provided a first memory for storing data standing for an object to be planned and data of an intermediate planning procedure and planning results, and a second memory for storing a definition of an explaining statement. A plan is prepared on the basis of data in the first memory, and data in course of planning and data of planning results are stored in the first memory. An explaining statement concerning planning is prepared on the basis of the contents of the first and second memories and displayed.

Stored in the second memory is a statement defining an output form comprised of a fixed part and a variable part (variable) of an explaining statement concerning a planning procedure and planning results. The processing of preparing and displaying the explaining statement is carried out in course of the planning or after completion of the planning, the fixed part of the explaining statement stored in the second memory is displayed as it is, and the value of a variable in the variable part is determined on the basis of the data in the first memory and displayed.

Through the above processings, the planning support method can be realized which can display desired information concerning a planning procedure and planning results, i.e., information indicative of grounds for the planning results in planning various kinds of plans to facilitate evaluation such as corroboration of the quality and propriety of the planning results, thus making it possible to deal with changing of plans with flexibility and accuracy.

BRIEF DESCRIPTION OF THE DRAWINGS

FIG. 3 is a diagram showing a data structure of planning process data;

FIGS. 4 to 6 are tables showing examples of actual planning process data;

FIG. 7 is a block diagram showing how functional blocks are related to a table in an edit processing unit 202;

FIG. 8 is a table showing an example of a variable's name dictionary;

FIG. 9 shows an example of a variable name correspondence table defining explaining object data representing names of input data of plan explanation and defining names of source programs describing (a) calculation logic;

FIG. 10 is a table showing an example of an explaining logic;

FIG. 11 shows an example of the calculation logic source program;

FIG. 13 shows the contents of a variable relation storage unit 1205;

FIG. 15 is a table showing an example of an explaining condition storage unit 1206;

FIG. 16 is a table showing an example of an explanation storage unit 1207;

FIG. 17 shows an example of an explaining logic source program;

FIG. 19 shows an example of display of planning results and an explaining statement;

FIG. 25 shows an example of a process logic;

FIG. 29 is a table showing an example of description of an explaining logic;

FIG. 30 is a table showing the contents of an explaining condition storage unit 3002;

FIG. 36 is a table showing an example of an explaining statement definition storage unit 104;

DESCRIPTION OF THE PREFERRED EMBODIMENTS

The invention will now be described by way of example with reference to the accompanying drawings.

A first embodiment of the invention will first be described.

Figure 1:
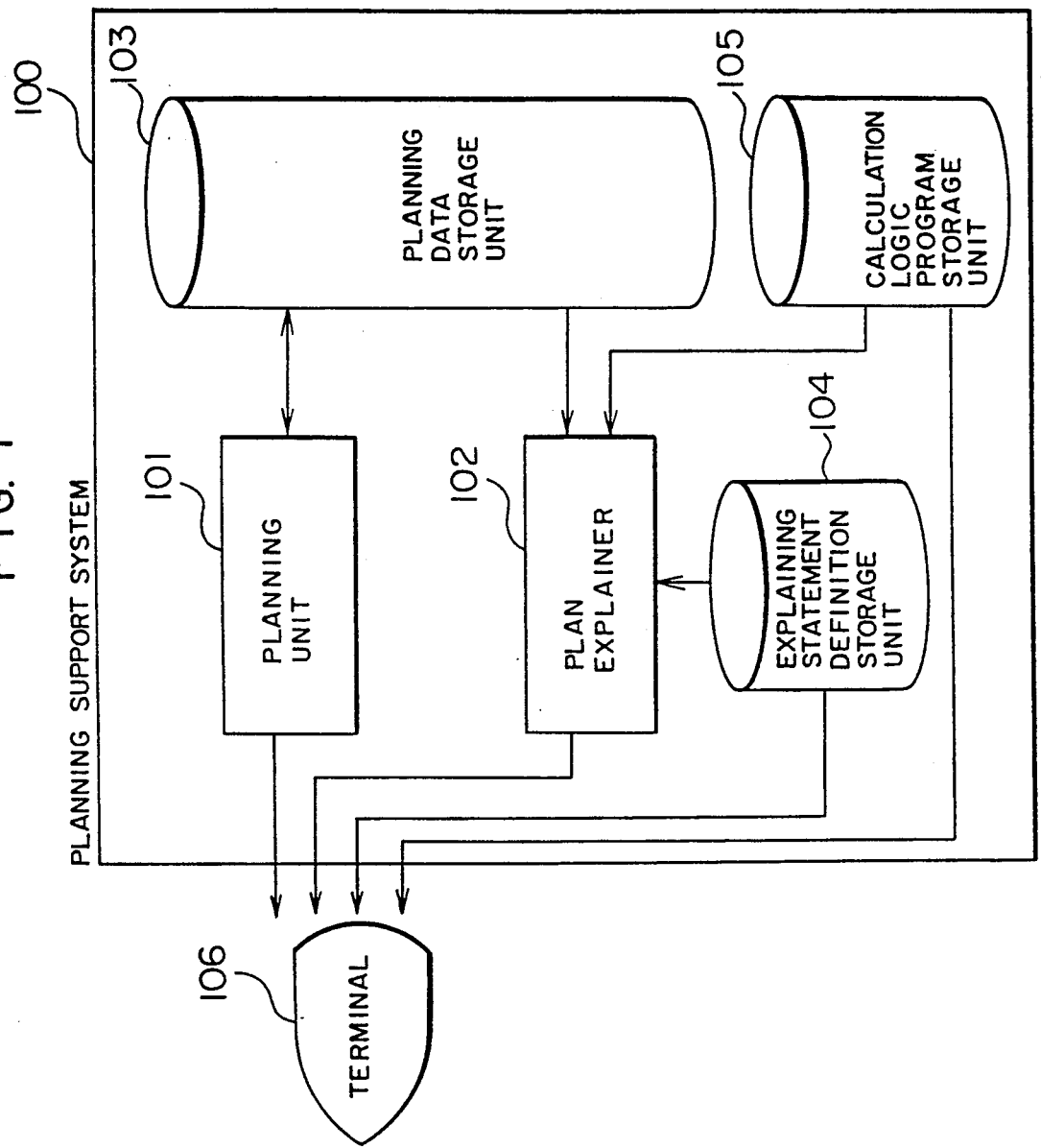
FIG. 1 is a block diagram showing how functional blocks are related to a table in a planning support system according to a first embodiment of the invention.

FIG. 1 shows how functional blocks are related to a table in a planning support system according to the first embodiment of the invention. The blocks and the table will be detailed as necessary with reference to relevant figures.

The planning support system, designated by reference numeral 100, includes a planning unit 101, a plan explainer unit 102, a planning data storage unit 103, an explaining statement definition storage unit 104, a calculation logic program storage unit 105, and a terminal 106. In response to a request from the terminal 106, a plan (FIG. 6) is prepared in accordance with the contents (FIGS. 4 and 5) of the planning data storage unit 103 under the direction of a planning program, a definition of an explaining statement explanatory of a planning procedure and results is inputted and an explaining statement concerning the planning procedure and results is prepared and displayed in accordance with the inputted contents.

The terminal 106 operates to start the planning support system 100, respond to a request from the end user to start the individual functions within the planning support system 100, and modify data in the explaining statement definition storage unit 104 and calculation logic program storage unit 105. Then, a processing (compile/link) is carried out which changes a modified calculation logic source program into a program format executable by a computer.

The terminal 106 may incorporate a memory for temporary storage of a prepared explaining statement.

The present embodiment will now be described by referring to an example of a process planning problem of determining which apparatus (machine) a production lot of products is allotted to and when the allotment is done, by taking into consideration the due-date, the possibility of the earliest outset and the like factor for a product manufactured through a plurality of work processes.

Figure 6:
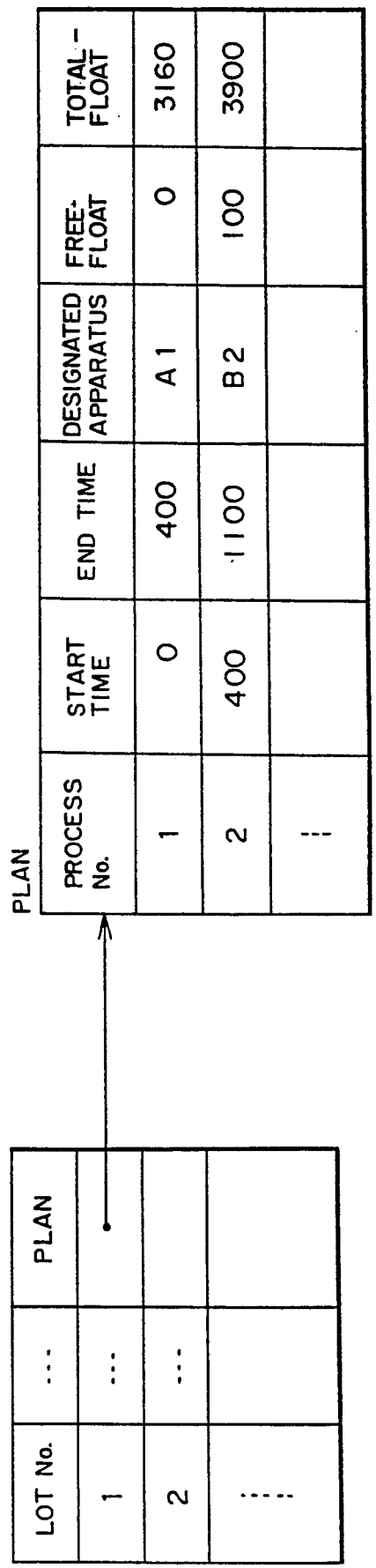

When started by the terminal 106, the planning unit 101 prepares a plan on the basis of object data from the planning data storage unit 103 and stores prepared planning data and intermediate data in the course of planning into the planning data storage unit 103. Stored into the planning data storage unit 103 are planning object data and data of planning results having data structures as shown in FIG. 3, for example, as well as data in course of planning. FIGS. 4 to 6 show an example of actual planning process data. In particular, FIG. 4 shows an example of production lot planning information, FIG. 5 an example of manufacture apparatus planning information, and FIG. 6 an example of data of planning results prepared by the planning unit 101.

Before describing the plan explainer 102, the explaining statement definition storage unit 104 and plan logic program storage unit 105 will be described.

Stored in the explaining statement definition storage unit 104 is data for defining an explaining statement explanatory of a plan procedure and results. The explaining statement includes a fixed part and a variable part. The fixed part is described using a desired character string and the variable part defines either a name of a variable corresponding to an output form or format or a name of a function describing a calculation formula. Thus, the explaining statement definition storage unit 104 has an output form defining formats of the fixed and variable parts of the explaining statement and an output variable definition defining the variable's name corresponding to the variable part or the function name of the function describing the calculation formula. An example of the explaining statement definition storage unit 104 is shown in FIG. 36. FIG. 36 indicates that the format of the variable part is "% identifier" in compliance with C language. It is also noted that in the present embodiment the function name begins with "f_".

Stored in the calculation logic program storage unit 105 are a calculation logic source program corresponding to a function name defined in an output variable definition in the explaining statement definition storage unit 104 and an executable program corresponding to the calculation logic source program.

Figure 37:
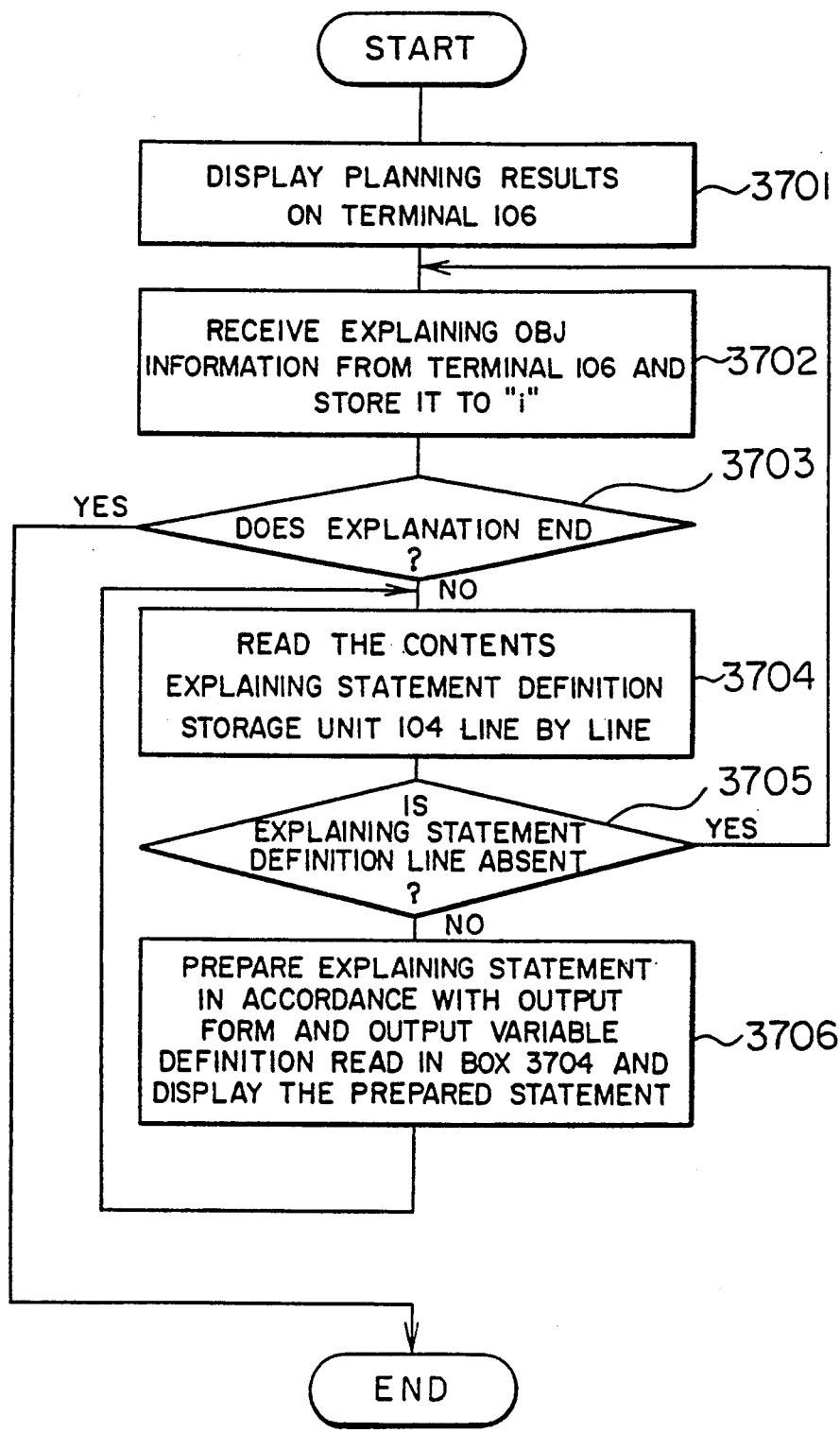
FIG. 37 is an operation flow chart for a plan explainer unit 102.

The operation of the plan explainer unit 102 will be described with reference to an operation flow chart of FIG. 37. It is to be noted that a desired plan is prepared in advance by planning unit 101 and has been stored in the planning data storage unit 103.

When started by the terminal 106, the plan explainer unit 102 first displays planning results on the terminal 106 in accordance with data of planning results sent from the planning data storage unit 103 (box 3701). Subsequently, explaining object information (lot number in the present embodiment) is inputted from the terminal 106 and the data is stored (box 3702). If explaining end information is inputted, the processing ends (box 3703). Thereafter, the output form and output variable definition in the explaining statement definition storage unit 104 are read line by line (box 3704). In the absence of any line to be read in box 3703, the procedure returns to the processing of box 3702 (box 3705). In accordance with the output form read in box 3704, the fixed part is displayed as it is. When a format of the variable part beginning with "%" is defined, data corresponding to a variable name stored in the output variable definition is displayed in accordance with the format on the basis of the contents of the planning data storage unit 103 and the procedure returns to the processing of box 3704 (box 3706). When a function name beginning with "f_" is defined in the output variable definition, a program for the function name stored in the calculation logic program storage unit 105 is started and the calculation results are displayed.

Figure 38:
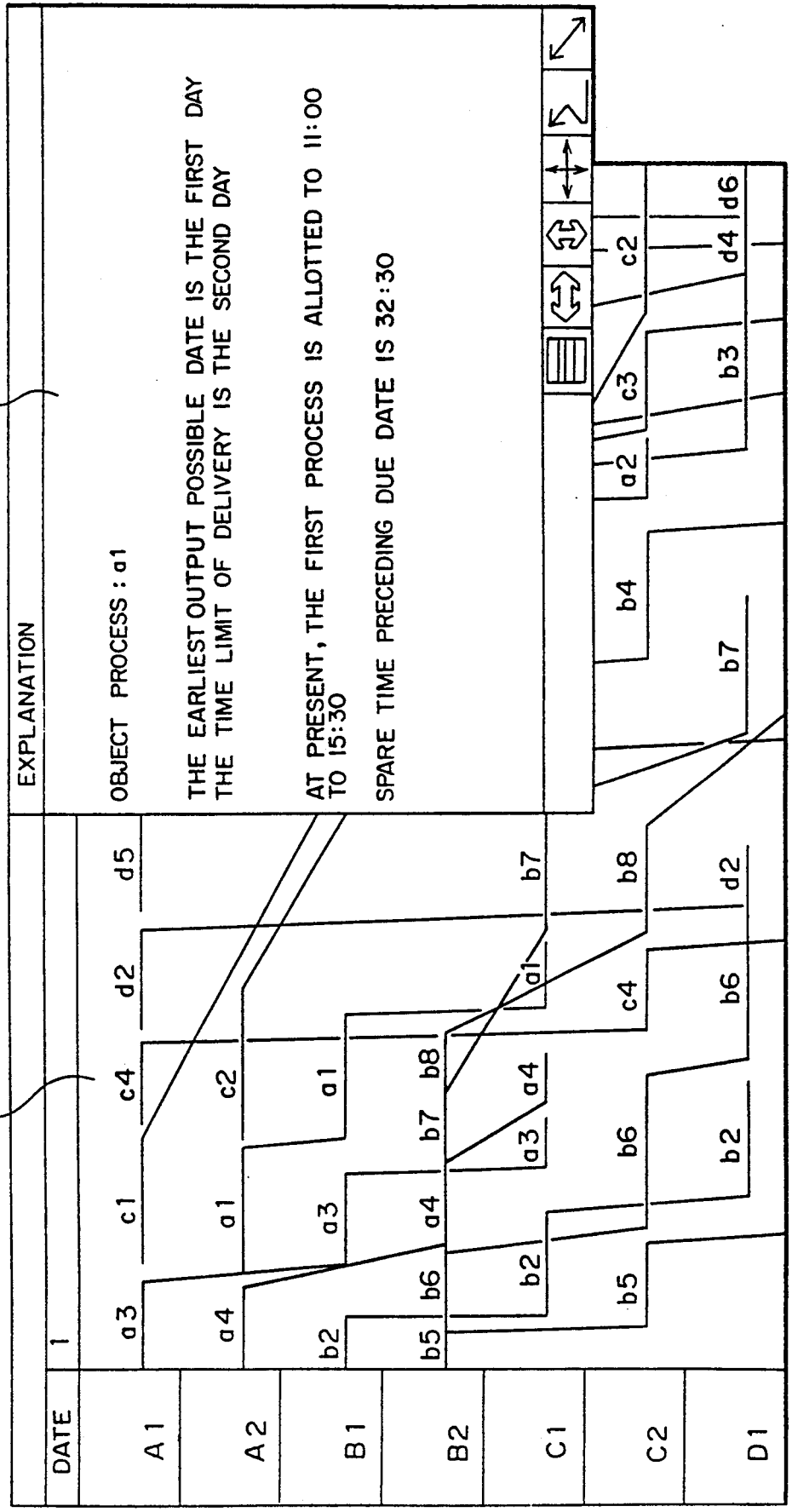
FIG. 38 shows an example of display of planning results and an explaining statement.

FIG. 38 shows an example of display of the planning results and explaining statement. In particular, FIG. 38 shows the state wherein a manufacturing process planning table 381 for various products (a1, a2, a3 ... b1, b2, b3 ... c1, c2 ... d1, d2 ... ) which stands for a prepared plan and an explaining statement 382 of the plan are delivered simultaneously to the screen; otherwise each of the planning table 381 and explaining statement 382 may be delivered independently. Indicated in the planning table 381 is the allotment period (time) by which individual products are allotted or distributed to individual apparatus (A1, A2, B1, B2, C1, C2, D1 ... ) used on production line. Even skilled experts would face difficulties in evaluating whether this plan is suitable for a specified product, for example, a1 or in determining rapidly how the plan should be modified, by merely looking up the planning table 381. The computer responds to a request of the user to adjust planning information concerning production process for a desired object, for example, the product a1 in FIG. 38 so as to display the resulting information in the output form easy for the user to understand, as indicated in the plan explaining statement 382. The user consults the explaining statement 382 to decide whether the plan is appropriate, and acquires information for modifying the plan table 381.

According to the present embodiment, grounds for conclusion can be indicated by the explaining statement and advantageously, the quality of the results can be determined accurately.

Further, in the present embodiment, the definition of the explaining statement used to display various kinds of information occurring in course of planning can be described/changed easily in terms of the table form and therefore, to advantage, the behavior of the system in course of planning can be understood easily without preparing dedicated programs.

Since in the present embodiment the user can select, as desired, the explaining object by manipulating the terminal, only an explaining statement of a desired planning object can be displayed and labor and time for retrieval of unnecessary information can be excluded.

The present embodiment is applied to the system handling the planning problem but the invention may be applicable to systems handling other problems, thereby attaining the advantage that the system behavior can be grasped with ease in various types of system.

Figure 2:
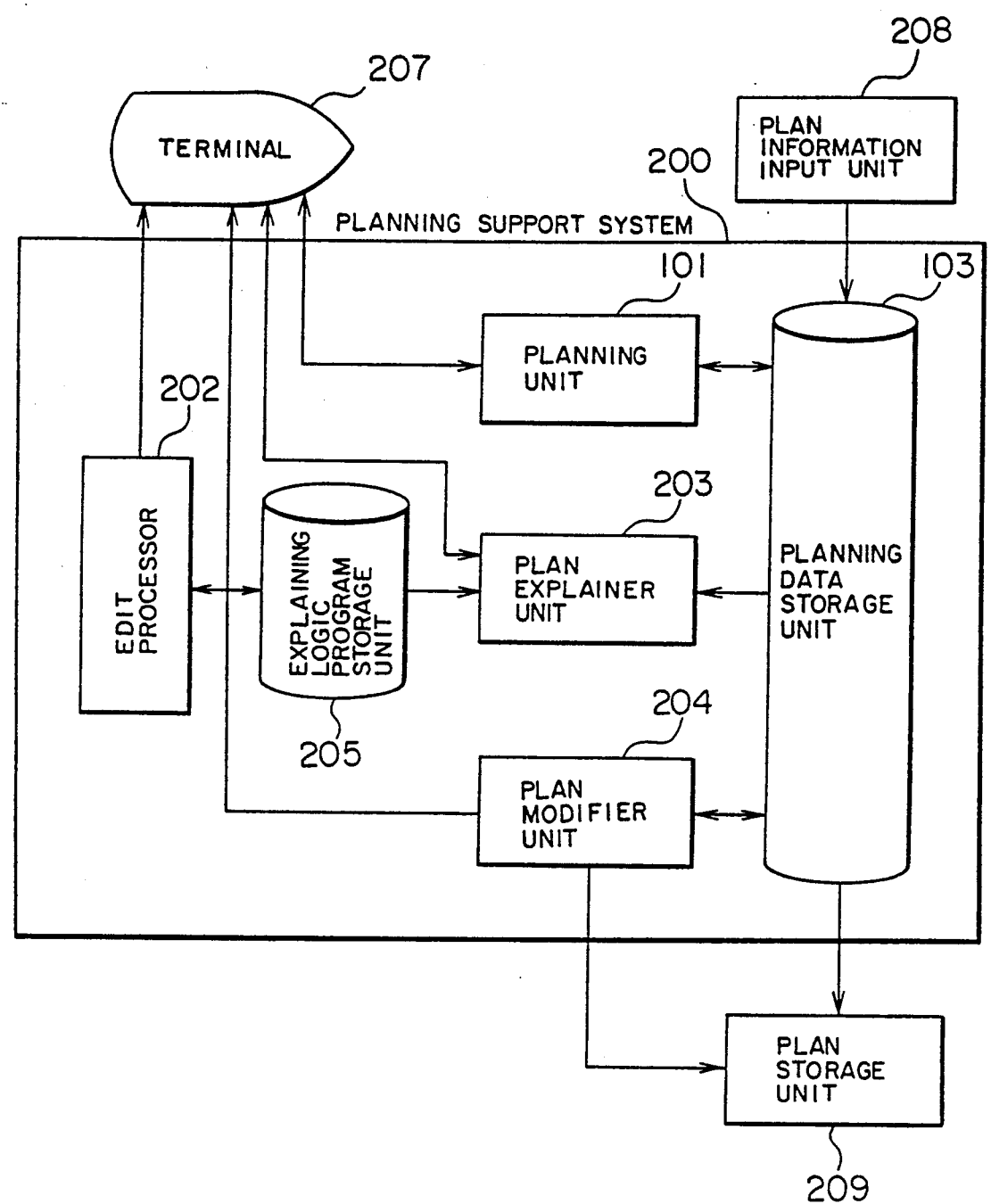
FIG. 2 is a block diagram showing how functional blocks are related to a table in a planning support system according to a second embodiment of the invention.

A planning support system according to a second embodiment of the invention will now be described by mainly referring to FIG. 2 showing how functional blocks are related to a table.

The planning support system of this embodiment, designated by reference numeral 200, includes a planning unit 101, an edit processing unit 202, a plan explainer unit 203, a plan modifier unit 204, an explaining logic program storage unit 205, a planning process data storage unit 103, a terminal 207, a plan input unit 208 and a plan storage unit 209. The planning unit 101 and the planning data storage unit 103 are the same as those of the first embodiment. In the planning support system 200, when a request is received from the terminal 207, a plan is prepared on the basis of the contents of planning data storage unit 103 which is inputted from the plan input unit 208, an explaining logic which describes a logic explanatory of a planning procedure and results in terms of process technical terminology or Japanese language is inputted and converted into a program capable of being processed by a computer, the program is stored in the explaining logic program storage unit 205, an explaining statement concerning the planning procedure and results is displayed by terminal 207 on the basis of the contents of the storage unit 205, and the planning results are modified as necessary and stored in the plan storage unit 209.

The terminal 207 is operable to start the planning support system 200, start individual functions of the planning support system 200 in response to a request from the end user and edit data such as explaining logic and planning logic.

The plan information input unit 208 receives planning object data and stores it into the planning data storage unit 103.

FIG. 7 shows how functional blocks are related to a table in the edit processing unit 202. As illustrated, the edit processing unit 202 includes a dictionary edit unit 701, an explaining logic edit unit 702, a calculation logic edit unit 703, a pre-compile unit 704, a variable name correspondence table storage unit 705, an explaining logic storage unit 706 and a calculation logic source program storage unit 707. The edit processing unit 202 responds to a request of the end user through the terminal 207 to start the editors 701 to 703. The respective edit processing units 701 to 703 will now be described.

Prior to describing the dictionary editor 701, it should be understood that the variable name correspondence table is a conversion table adapted to convert unfamiliar variable's names such as technical terminology used by persons in charge of planning in the planning procedure or Japanese language into English codes which can be handled easily by the computer. FIG. 8 shows an example of the variable's dictionary used for data of planning object and data of planning results having, for example, data structures shown in FIG. 3. FIG. 9 shows an example of the variable name correspondence table which defines explaining object data standing for input information used upon explanation of planning results and defines the name of a source program describing calculation logics such as variables utilized in explaining logics.

Figure 39:
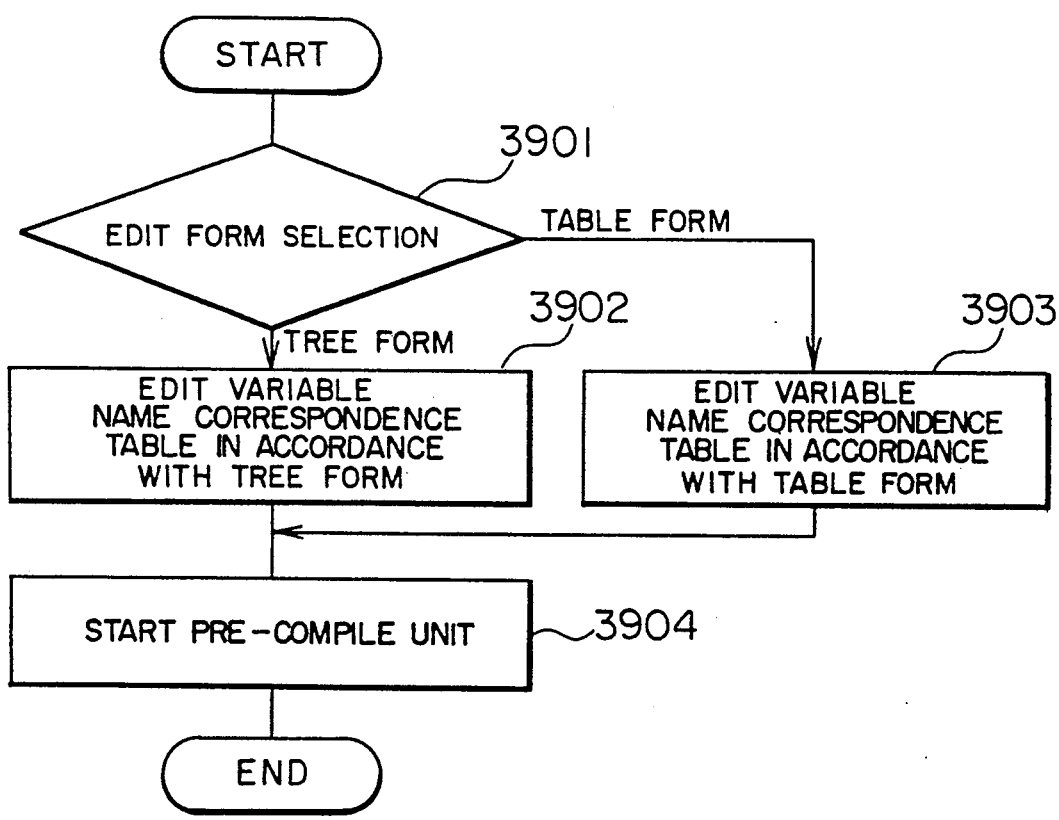
FIG. 39 is an operation flow chart for a dictionary edit unit 701.

The operation of the dictionary editor 701 will be described with reference to an operation flow chart shown in FIG. 39.

The dictionary editor 701 is started by an edit request inputted from the terminal 207 to first cause, through the terminal 207, the end user to select an edit form from tree form or table form (box 3901). If the tree form is designated in box 3901, the contents of the variable name correspondence table stored in the variable name correspondence table storage unit 705 is displayed on the terminal 207 in the data structure form (tree form) shown in FIG. 3 and the end user edits the displayed contents (box 3902). If the table form is designated in box 3901, the contents of the variable name correspondence table stored in the variable name correspondence table storage unit 705 is displayed on the terminal 207 in the table form and the end user edits the displayed contents (box 3903). Subsequently, the pre-compile unit 704 is started and the procedure ends (box 3904).

Figure 40:
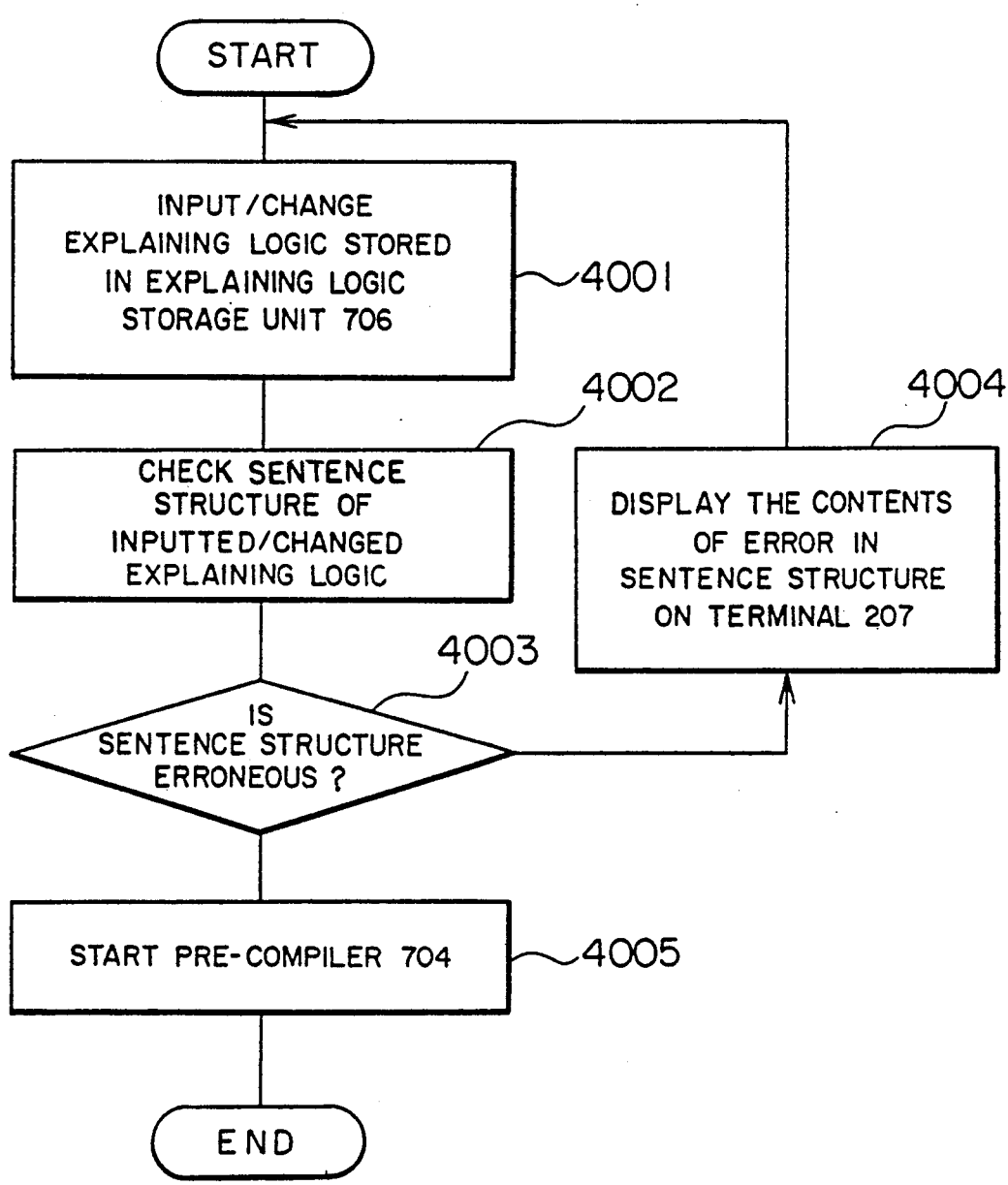
FIGS. 40 to 42 are operation flow charts for explaining logic edit unit 702, calculation logic edition unit 703 and plan modifier unit 204, respectively.

The operation of the explaining logic editor 702 will be described with reference to an operation flow chart of FIG. 40.

The explaining logic editor 702 responds to an edit request inputted from the terminal 207 to receive/change, through the terminal 207, an explaining logic stored in the explaining logic storage unit 706 (box 4001). Subsequently, a sentence structure of the changed explaining logic is checked (box 4001). It is decided whether an error is found in sentence structure checking in box 4002 (box 4003). If an error is determined in box 4003, the contents indicative of the error is displayed on the terminal 207 and the procedure returns to the processing of box 4001 (box 4004). If no error is determined in box 4003, the pre-compile unit 704 is started and the procedure ends (box 4005). The explaining logic referred to herein is data which defines an explaining statement explanatory of a planning procedure and results and defines the condition and the like factor for delivery of the explaining statement, by using unfamiliar variable names such as technical terminology used by persons in charge of planning or Japanese language. FIG. 10 shows an example of the explaining logic explanatory of a planning procedure and results in, for example, process planning service. In the explaining logic of FIG. 10, 1001 designates an explain block statement indicative of the beginning of the explaining logic, 1002 a "for" statement defining affixes of variables, 1003 a definition part defining explanation definition variables, 1004 a logic part defining explaining statement selection conditions, 1005 to 1007 an expression part defining the output forms of explaining statements, the expression part being capable of providing a plurality of definitions and ending in an end expression statement, and 1008 an end block statement indicative of the end of the explaining logic.

FIG. 19 shows output display states of the plan and the explaining statement. The expression (explanation 1 of job) 1006 in the explaining statement definition of FIG. 10 corresponds to an explaining statement 192 on the upper display diagram in FIG. 19. The expression (explanation 2 of job) 1007 in the explaining statement definition of FIG. 10 where definition statement is omitted corresponds to an explaining statement 194 on the lower display diagram in FIG. 19.

Figure 41:
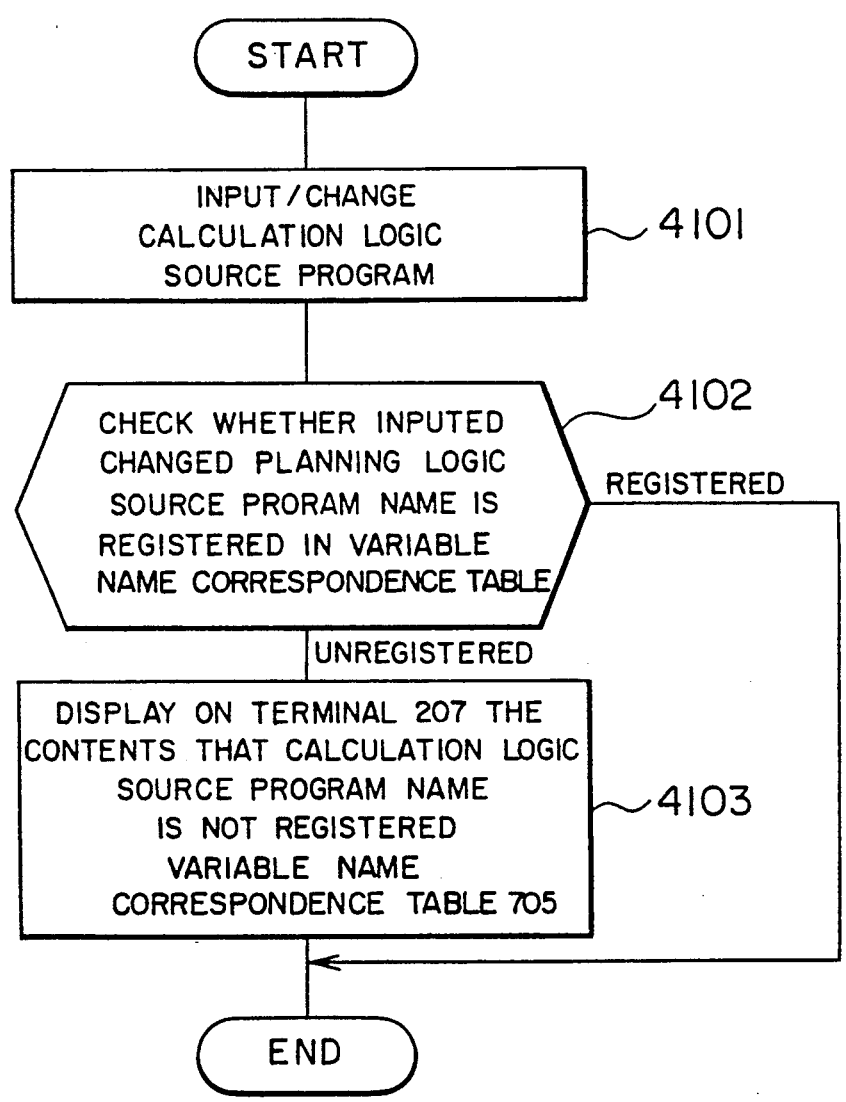

The operation of the calculation logic edit unit 703 will be described with reference to an operation flow chart of FIG. 41.

The calculation logic editor 703 responds to an edit request inputted from the terminal 207 to receive/change, through the terminal 207, a program stored in the calculation logic source program storage unit 707 (box 4101). Subsequently, the calculation logic editor 703 checks whether a calculation logic source program name inputted to the variable name correspondence table storage unit 705 is registered (box 4102). When the inputted calculation logic source program name is determined to be unregistered in box 4102, the contents "The inputted calculation logic source program name is unregistered and the calculation logic source program name should be registered in the variable name correspondence table storage unit 705" is displayed on the terminal 207 (box 4103). FIG. 11 shows an example of the source program stored in the calculation logic source program 707. The calculation logic source program exemplified in FIG. 11 is a program which returns by using as an argument a lot number of a certain product and time for the product to be processed by an apparatus of a certain number.

The pre-compile unit 704 converts the explaining logic in the explaining logic storage unit 706 and the source program in the calculation logic source program storage unit 707 into a program executable by the computer, and stores the program in the explaining logic program storage unit 205.

Figure 12:
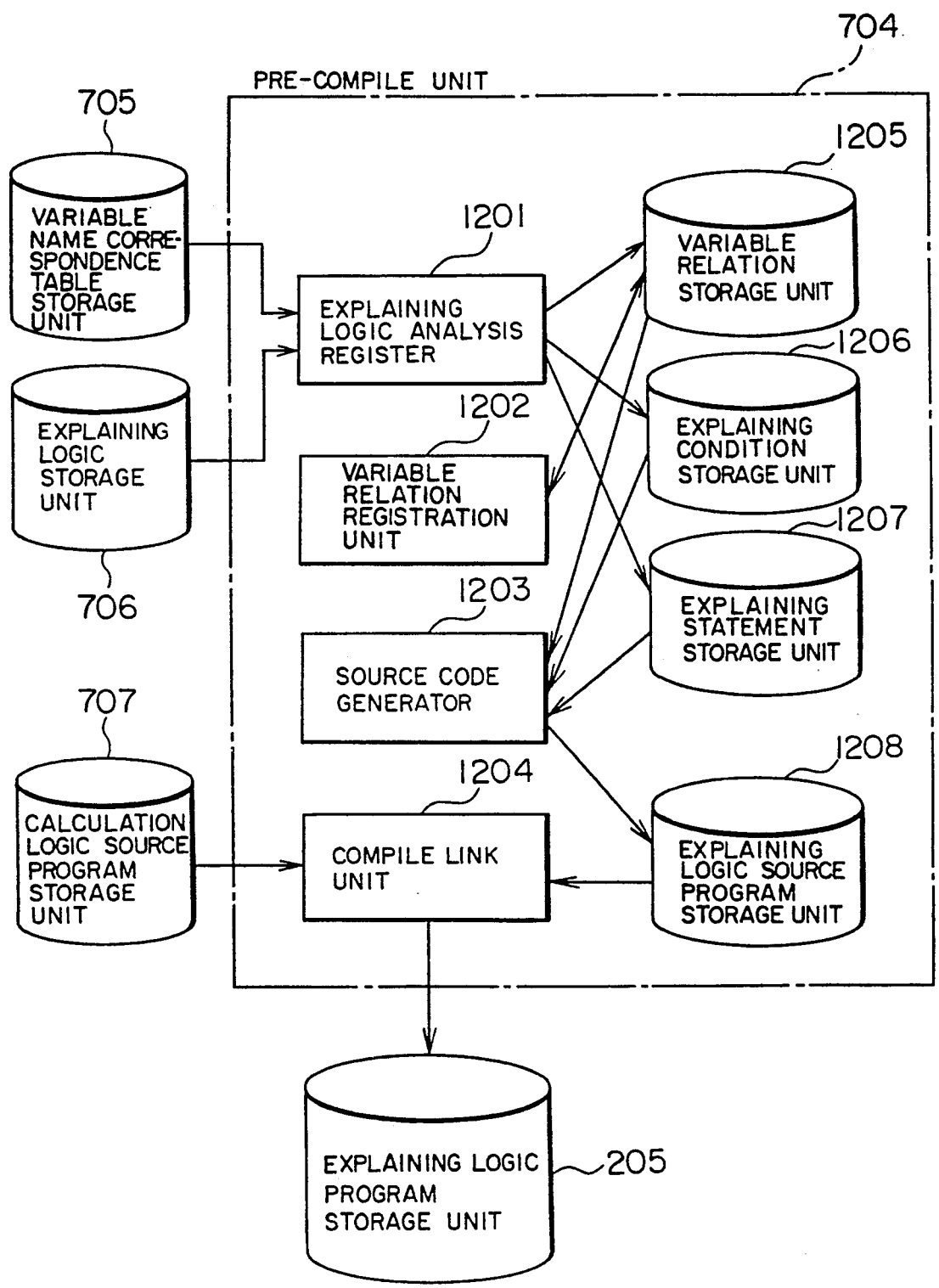
FIG. 12 is a block diagram showing how functional blocks are related to a table in a pre-compile unit 704.

FIG. 12 shows how functional blocks are related to a table in the pre-compiler 704. As illustrated, the pre-compiler 704 includes an explaining logic analysis register unit 1201, a variable relation register unit 1202, a source code generator unit 1203, a compile link unit 1204, a variable relation storage unit, an explaining condition storage unit 1206, an explaining statement storage unit 1207 and an explaining logic source program storage unit 1208. The variable relation storage unit 1205 includes an affix registration table 1301, a variable registration table 1302 and an explaining statement name registration table 1303 and is operable to store affixes of variables contained in the explaining logic (explaining variables) and a correspondence table describing Japanese variable's names or English variable's name corresponding to definition variable's names.

When the contents of the explaining logic storage unit 706 or variable's name dictionary storage unit 705 is renewed, the pre-compiler 704 is operated to activate the explaining logic analysis register unit 1201, variable relation register unit 1202, source code generator unit 1203 and compile link unit 1204 sequentially.

Figure 14:
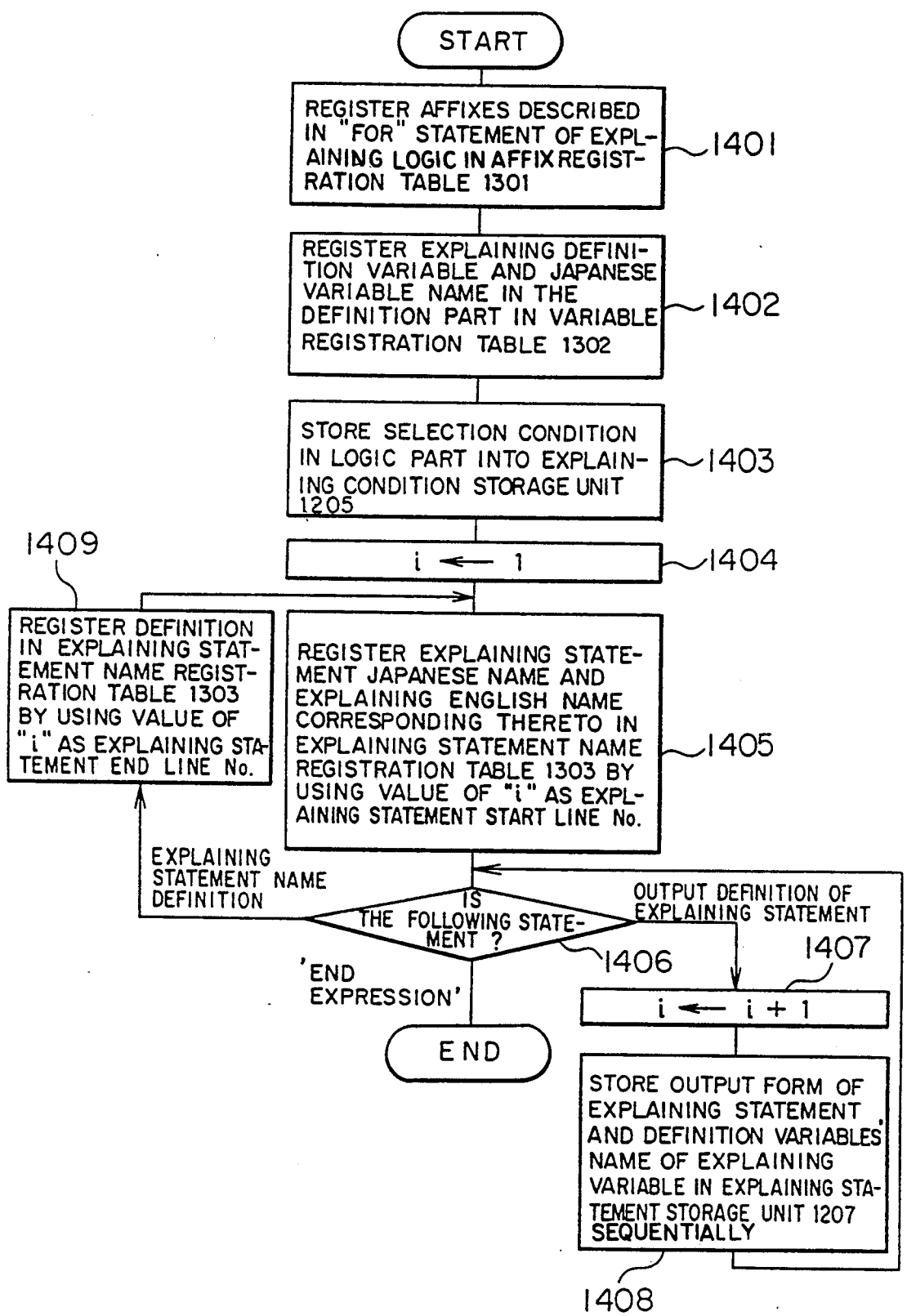
FIG. 14 is a flow chart showing the operation of an explaining logic analysis registration unit 1201.

The operation of the explaining logic analysis register unit 1201 will be described with reference to an operation flow chart of FIG. 14.

The explaining logic in the explaining logic storage unit 706 is first inputted, wording analysis and sentence structure analysis of the explaining logic are carried out, affixes such as x, y and z described in the "for" statement and Japanese variable's names corresponding to the affixes are registered in the affix registration table 1301, and English variable's names corresponding to the Japanese variable's names of the affixes are obtained from the variable's name dictionary 705 and stored in the affix registration table 1301 (box 1401). Similarly, explanation definition variables beginning with $ on the left side and Japanese variable's names on the right side in the definition part are registered in the variable registration table 1302. English variable's names corresponding to affixes of the Japanese variable names or technical terms on the right side are obtained from the affix registration table 1301 and stored in the variable registration table 1302 (box 1402). Also, the conditions for selection of explaining statements described in the logic part are stored in the explaining condition storage unit 1206 (box 1403). More particularly, a conditional statement described in the "if" clause and an explaining statement Japanese name in the "then" clause which is delivered when "if" clause stands are stored in the explaining condition storage unit 1206. At that time, if Japanese variables unregistered in the variable registration table 1302 exist in the "if" clause, they are registered in the variable registration table 1302. FIG. 15 shows an example of the explaining condition storage unit 1206. Subsequently, analysis of wordings and sentence structures in the expression part is carried out and execution of the following processing follows. Firstly, "i" is set to 1 (box 1404). An explaining statement Japanese name and an explaining statement English name corresponding to the explaining statement Japanese name are registered in the explaining statement name registration table 1303 by using the value of "i" as an explaining statement start line number (box 1405). The following statement is decided (box 1406) and if an output definition of an explaining statement is present, "i" is counted up (box 1407), an output definition of the explaining statement parenthesized by " " is analyzed, an output form and a definition variable name of an explaining variable are sequentially stored in the explaining statement storage unit 1207 (box 1408) and the procedure returns to the output of box 1405. If a definition of an explaining statement name is determined in box 1406, the definition is registered in the explaining statement name registration table 1303 by using the value of "i" as an explaining statement end line number (box 1409) and the procedure returns to the processing of box 1406. If "end express;" statement is determined in box 1406, the procedure ends. An example of the explaining statement storage unit 1206 is shown in FIG. 16.

The variable relation registration unit 1202 responds to the contents of the variable name correspondence table storage unit 705 to determine English code names corresponding to Japanese technical terms in the affix registration table 1301 and variable registration table 1302 and store the determined English names in the respective registration tables.

The source code generator unit 1203 receives the contents of each of the variable relation storage unit 1205, explaining condition storage unit 1206 and explaining statement storage unit 1207 and uses the English code names in the variable relation storage unit 1205 to prepare a source program complying with a language specification in the compile link unit 1204 and store the program in the explaining logic source program storage unit 1208. An example of the source program stored in the explaining logic source program storage unit 1208 is shown in FIG. 17. Especially, FIG. 17 shows an example of a source program converted into C language.

The compile link unit 1204 receives source programs from the explaining logic source program storage unit 1208 and calculation logic source program storage unit 707, converts the source programs into programs directly executable by the computer and stores the converted programs into the explaining logic program storage unit 205.

Figure 18:
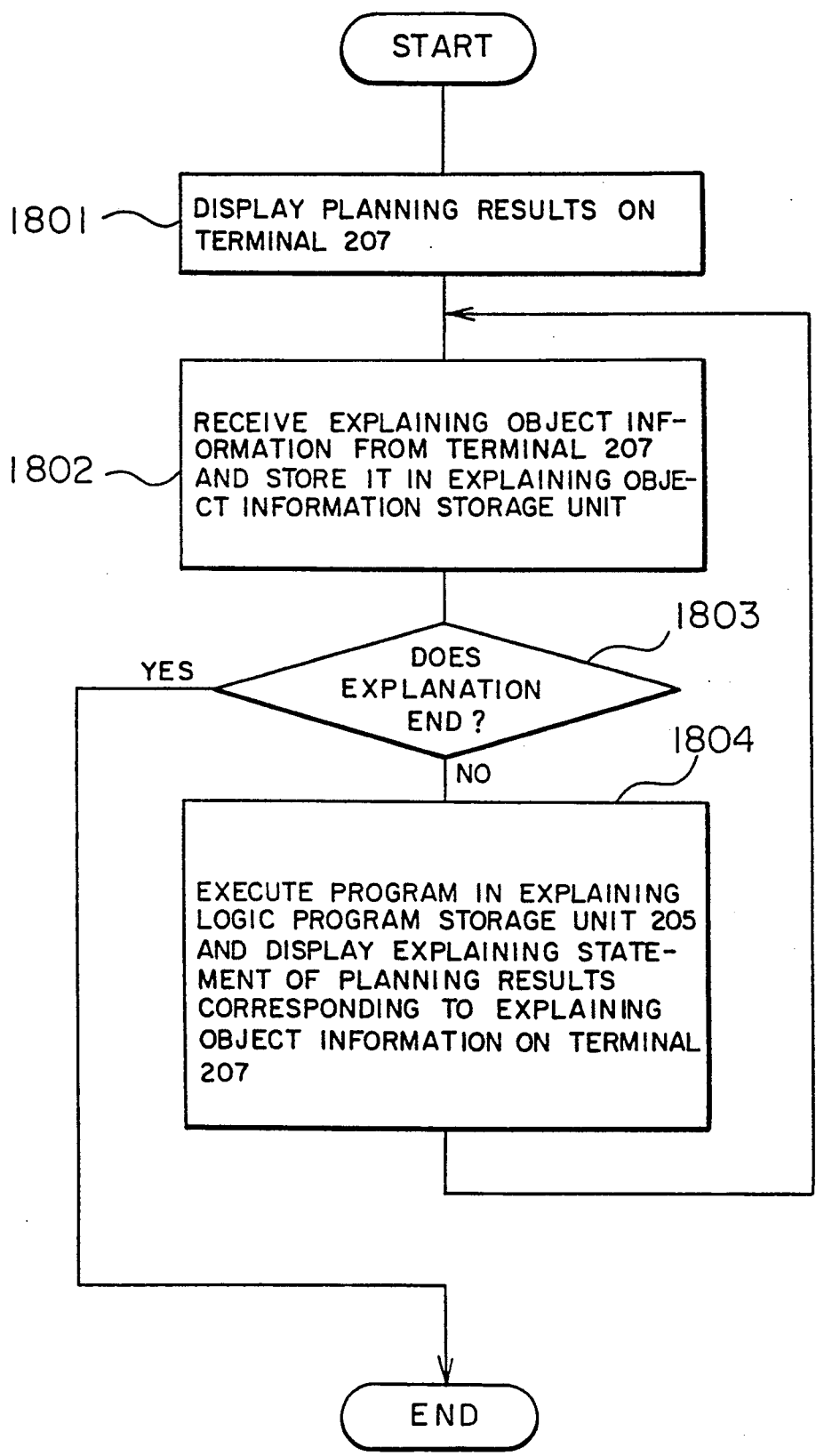
FIG. 18 is an operation flow chart for a plan explainer unit 203.

The operation of the plan explainer unit 203 will now be described with reference to an operation flow chart of FIG. 18.

When started through the terminal 207, the plan explainer unit 203 first responds to data of planning results from the planning object data 206 to display planning results on the terminal 207 (box 1801). Subsequently, the plan explainer unit 203 receives explaining object information from the terminal 207 and stores the information in the explaining object information storage unit (box 1802) disposed in the plan explainer unit 203. If at that time explaining end information is inputted, the procedure ends (box 1803). Subsequently, a program in the explaining logic program storage unit 205 is executed to display, on the terminal 207, a planning procedure corresponding to the explaining object information stored in the object information storage unit and a statement explanatory of the planning results, and the procedure returns to the processing of box 1802 (box 1804).

In the present embodiment, the explaining object information classifies the type of object into "job" and "apparatus (machine)", and when the object type is "job", the object log number and object process number of the job are stored in the object information storage unit but when the object type is "apparatus", the object apparatus number is stored in the object information storage unit.

Figure 32:
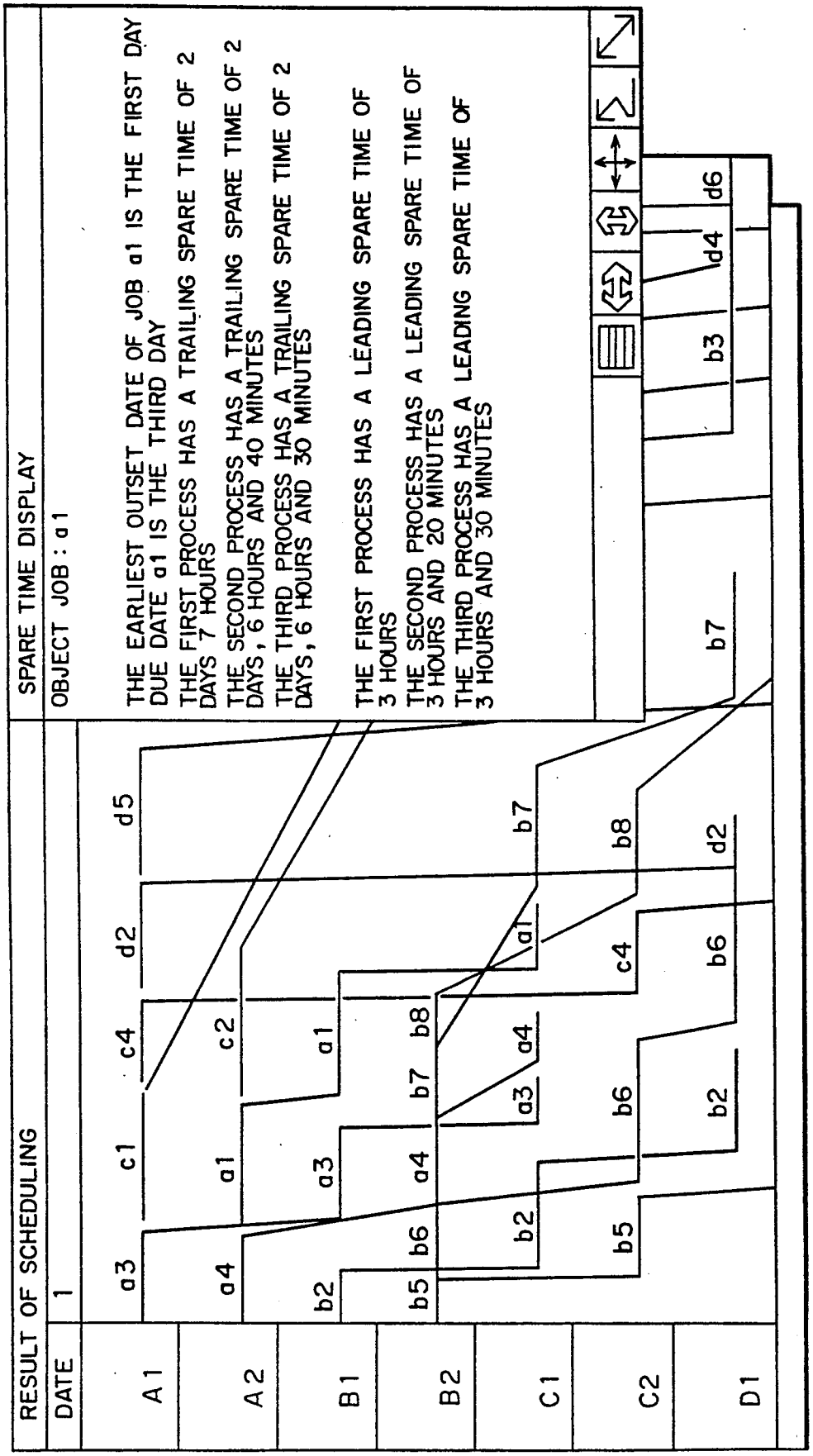
FIG. 32 is a diagram for explaining spare data.

FIGS. 19 and 32 show examples of display of the planning results and explaining statement. In particular, FIG. 19 shows at 191 an explanation of planning procedure and results of a job and at 194 an explanation of designated state of apparatus, and FIG. 32 shows an explanation of spare time data for an allotted job.

Figure 42:
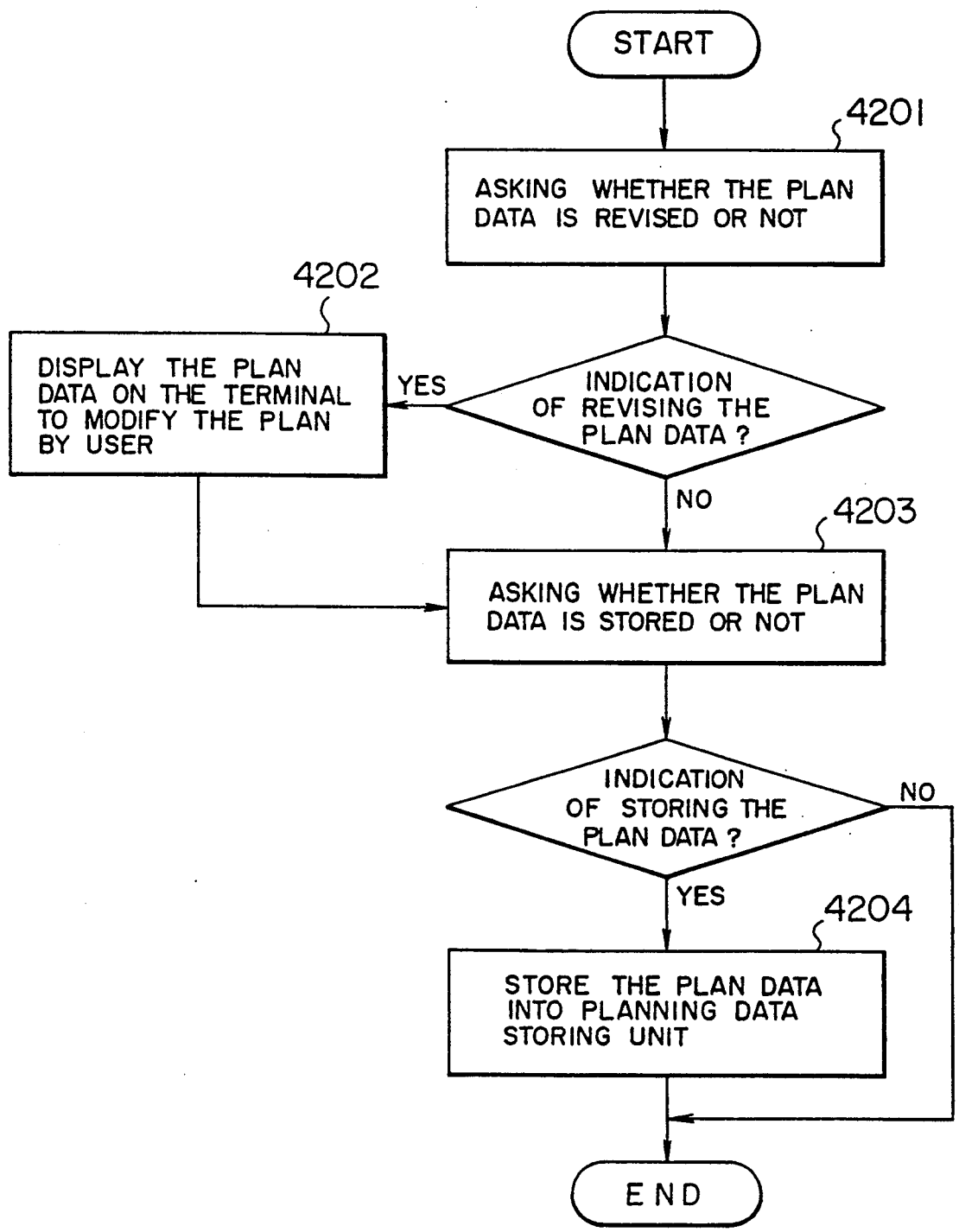

The operation of the plan modifier unit 204 will be described with reference to an operation flow chart of FIG. 42.

When started, the plan modifier 204 inquires, through the terminal 207, the end user whether planning data should be modified (box 4201). If plan data modification is designated in box 4201, planning data in the planning data storage unit 103 is displayed on the terminal 207 and the end user modifies the data (box 4202). If plan data modification is not designated in box 4201, the program proceeds to a processing of box 4203. Then, in box 4203, the plan modifier inquires, through the terminal 207, the end user whether the planning data should be stored (box 4203). If plan data registration is designated in box 4203, the planning data in the planning data storage unit 103 is stored as eventual plan data into the plan storage unit 209 and the procedure ends (box 4202). If plan data registration is not designated in box 4203, the procedure ends.

According to the present embodiment, grounds for conclusion can be indicated by the explaining statement and advantageously, the quality of the results can be determined accurately. Further, the prepared plan result can be modified as necessary and plans and appropriate plans can be prepared easily to advantage.

In the present embodiment, since the explaining logic for display of various kinds of information in course of planning can be described easily in Japanese language, the behavior of the system in course of planning can be understood easily to advantage without assistance of knowledge of computer.

In the present embodiment, since the explaining logic described in Japanese is converted into a computer program and executed, execution efficiency can advantageously be high.

In the present embodiment, the explaining object can be selected desiredly and therefore only an explaining statement of a desired plan object can be displayed and labor and time for retrieval of unnecessary information can be excluded.

When the source code generator unit 1203 prepares an explaining logic program by adding control statements repeatedly, a resulting program can be such that explaining statements can be prepared for all of object data and delivered to the memory unit. In this case, it is sufficient that the plan explainer 203 performs only a processing in which the contents of the aforementioned memory unit is read and displayed. This ensures that explaining information for a planning procedure concerning all of object data can be acquired easily to advantage.

In the present embodiment, the condition for selection of explaining statement is described in the explaining logic data but the explaining logic data may be described with only the output definition of the explaining statement. In this case, all of defined explaining statements are always displayed, thereby facilitating definition of explaining logic.

In the present embodiment, the explaining logic is defined in the form of a predetermined sentence structure but the explaining logic may be inputted in table form directly into the variable relation storage unit 1205, explaining condition storage unit 1206 and explaining statement storage unit 1207 and edited thereby, thus permitting omission of edit processing of the explaining logic.

The present embodiment is applied to the system handling the planning problem but the invention may be applicable to systems handling other problems, thereby attaining the advantage that the system behavior can be grasped with ease in various types of system.

Figure 20:
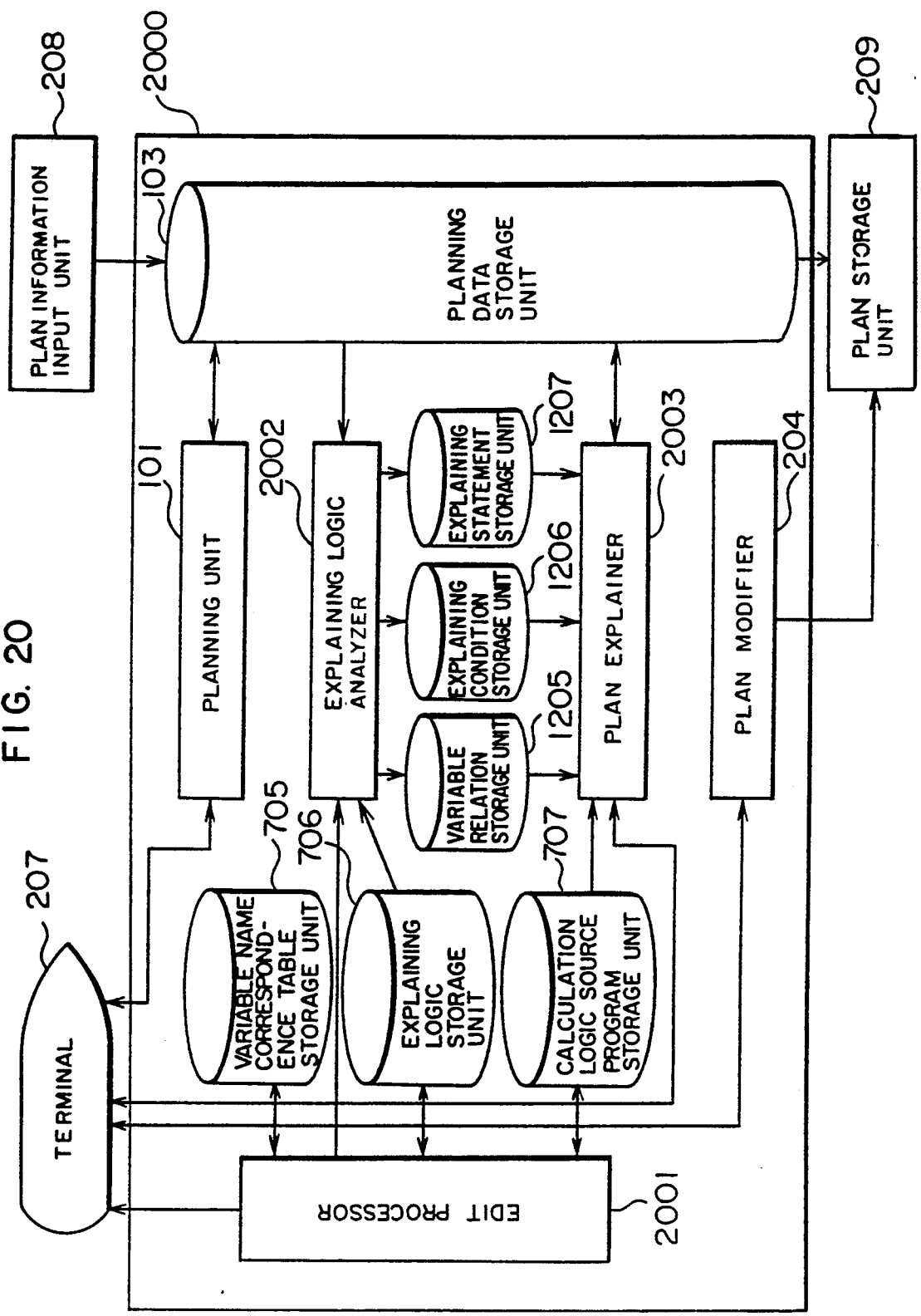
FIG. 20 is a block diagram showing how block diagrams are related to a table in a planning support system according to a third embodiment of the invention.
Figure 21:
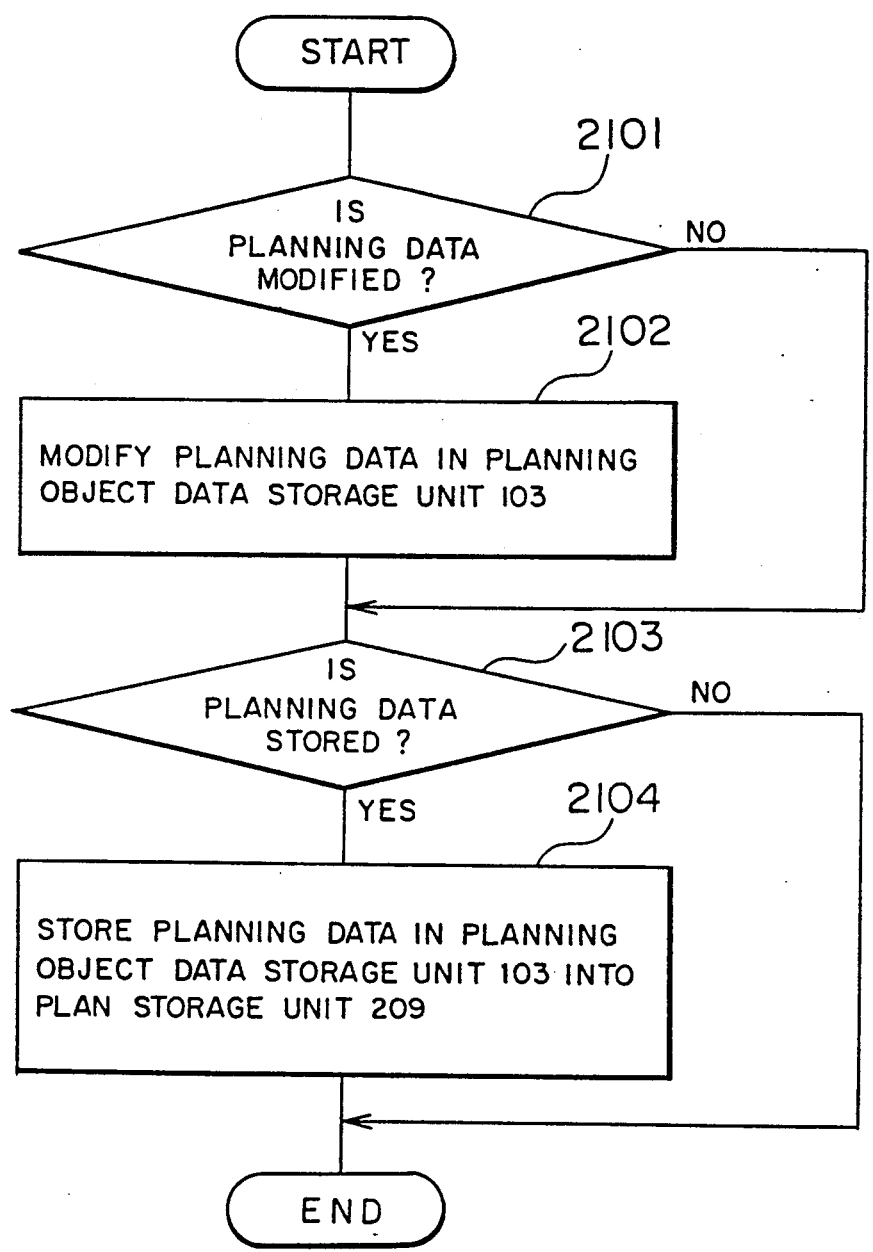
FIG. 21 is a diagram showing how functional blocks are related to a table in a plan modifier unit 204.

A planning support system according to the third embodiment of the invention will now be described by mainly referring to FIG. 20 showing how functional blocks are related to a table.

In the third embodiment of the present invention, the explaining logic is not previously compiled to a calculation program which can be executed by the computer, but directly interpreted and executed in response to the output request for the explaining statement from the terminal 207.

The planning support system 2000 of this embodiment includes a planning unit 101, an edit processing unit 2001, an explaining logic analysis unit 2002, a plan explainer unit 2003, a plan modifier unit 204, a variable name correspondence table storage unit 705, an explaining logic storage unit 706, a calculation logic source program storage unit 707, a variable relation storage unit 1205, an explaining condition storage unit 1206, an explaining statement storage unit 1207, a planning data storage unit 103, a terminal 207, a plan input unit 208 and a plan storage unit 209. The planning unit 101 and plan object data storage unit 103 are the same as those of the first embodiment, and the plan modifier 204, variable name correspondence table storage unit 705, explaining logic storage unit 706, calculation logic source program storage unit 707, variable relation storage unit 1205, explaining condition storage unit 1206, explaining statement storage unit 1207, terminal 207, plan input unit 208 and plan storage unit 209 are the same as those of the second embodiment.

Responsive to an edit request inputted from the terminal 207, the edit processor 2001 edits, through the terminal 207, the contents of the variable's name dictionary storage unit 705 and explaining logic storage unit 706 or the contents stored in the calculation logic source program storage unit 707.

The explaining logic analyzer 2002 includes an explaining logic analysis registration unit 1201 and a variable relation registration unit 1202 and when the contents of the explaining logic storage unit 706 or variable name correspondence table storage unit 705 is renewed, it is operated to activate the explaining logic analysis register 1201 and variable relation register 1202 sequentially. The explaining logic analysis register 1201 and variable relation register 1202 operate as described in connection with the second embodiment and results of their execution are stored in variable relation storage unit 1205, explaining condition storage unit 1206 and explaining statement storage unit 1207.

Figure 22:
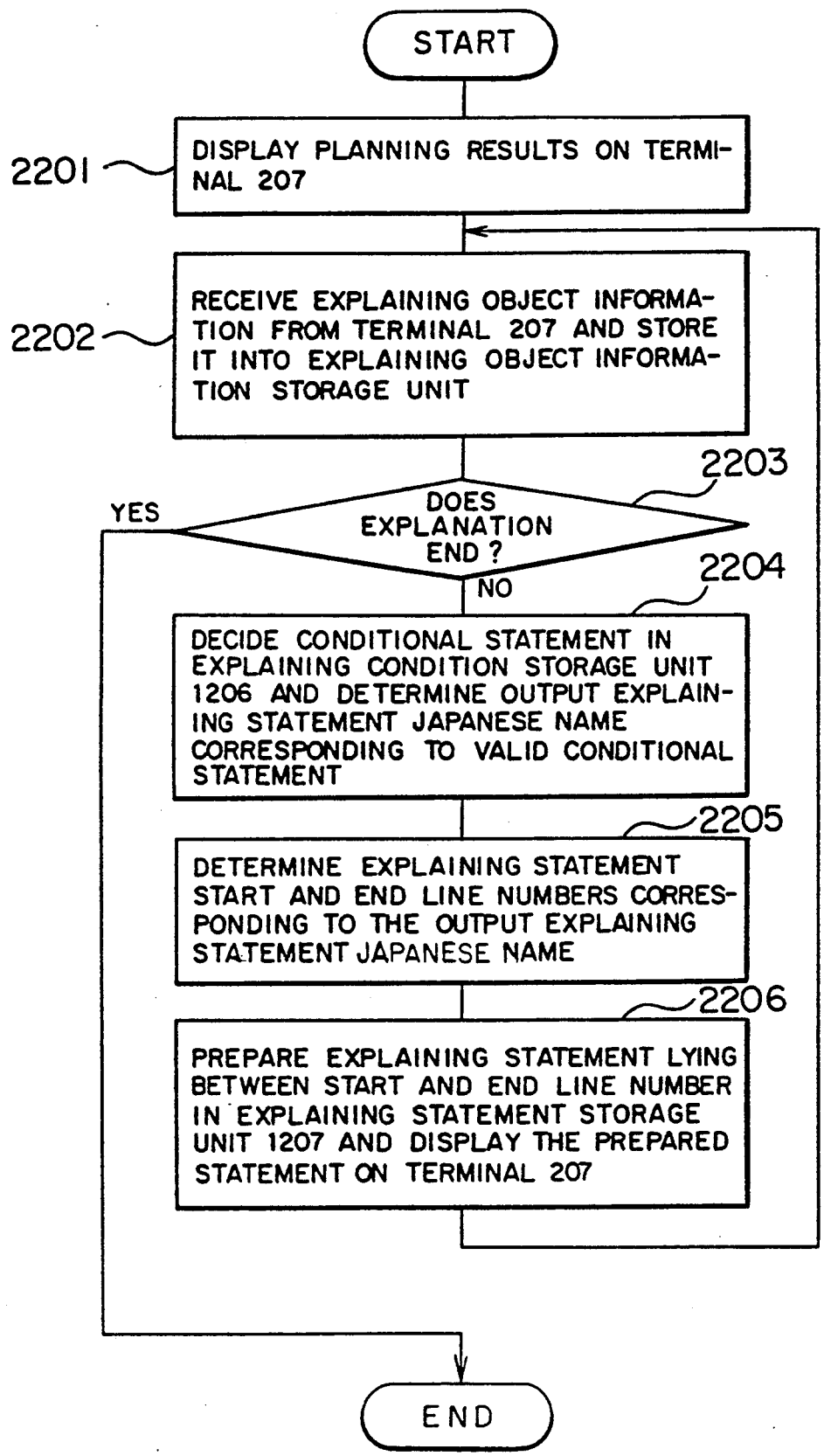
FIG. 22 is an operation flow chart for a plan explainer unit 2003.

The operation of the plan explainer 2003 will be described with reference to an operation flow chart of FIG. 22.

When the plan explainer 2003 is started through the terminal 207, the planning result display unit 101 first displays results of planning on the terminal 207 on the basis of planning result data in the plan object data 206 (box 2201). Subsequently, the plan explainer 2003 receives explaining object information from the terminal 207 and stores it in the explaining object information storage unit (box 220). If explanation end information is inputted, the procedure ends (box 2203). Subsequently, a conditional statement in the explaining condition storage unit 1206 is decided on the basis of the contents of the explaining object information storage unit to determine an output explaining statement Japanese name corresponding to a valid conditional statement (box 2204). Thereafter, an explaining statement start line number and an explaining statement end line number, both corresponding to the aforementioned output explaining statement Japanese name are derived from the explaining statement registration table 1303 in the variable relation storage unit 1205 (box 2205). An explaining statement is prepared on the basis of output form and output variable lying between the previously obtained explaining statement start and end line numbers in the explaining statement storage unit 1207 and displayed on the terminal 207; and then the procedure returns to box 2202 (box 2206). At that time, the value of output variable is determined in accordance with the value of English variable's name obtained from the variable registration table 1302 or by the calculation logic source program.

According to the present embodiment, grounds for conclusion can be indicated by the explaining statement and advantageously, the quality of the results of the planning can be determined accurately. Further, the prepared plan can be modified as necessary and plans and appropriate plans can be prepared easily to advantage.

In the second embodiment, the explaining logic is pre-compiled to be converted into a program executable directly by the computer and by which the explaining statement is prepared and displayed but according to the present embodiment, the explaining logic is analyzed directly and executed so that the explaining statement can be displayed similarly without executing the pre-compile processing in the second embodiment. The present embodiment is therefore suited to an application where the contents of explanation is frequently changed as in the case of initial phase of system development.

Figure 23:
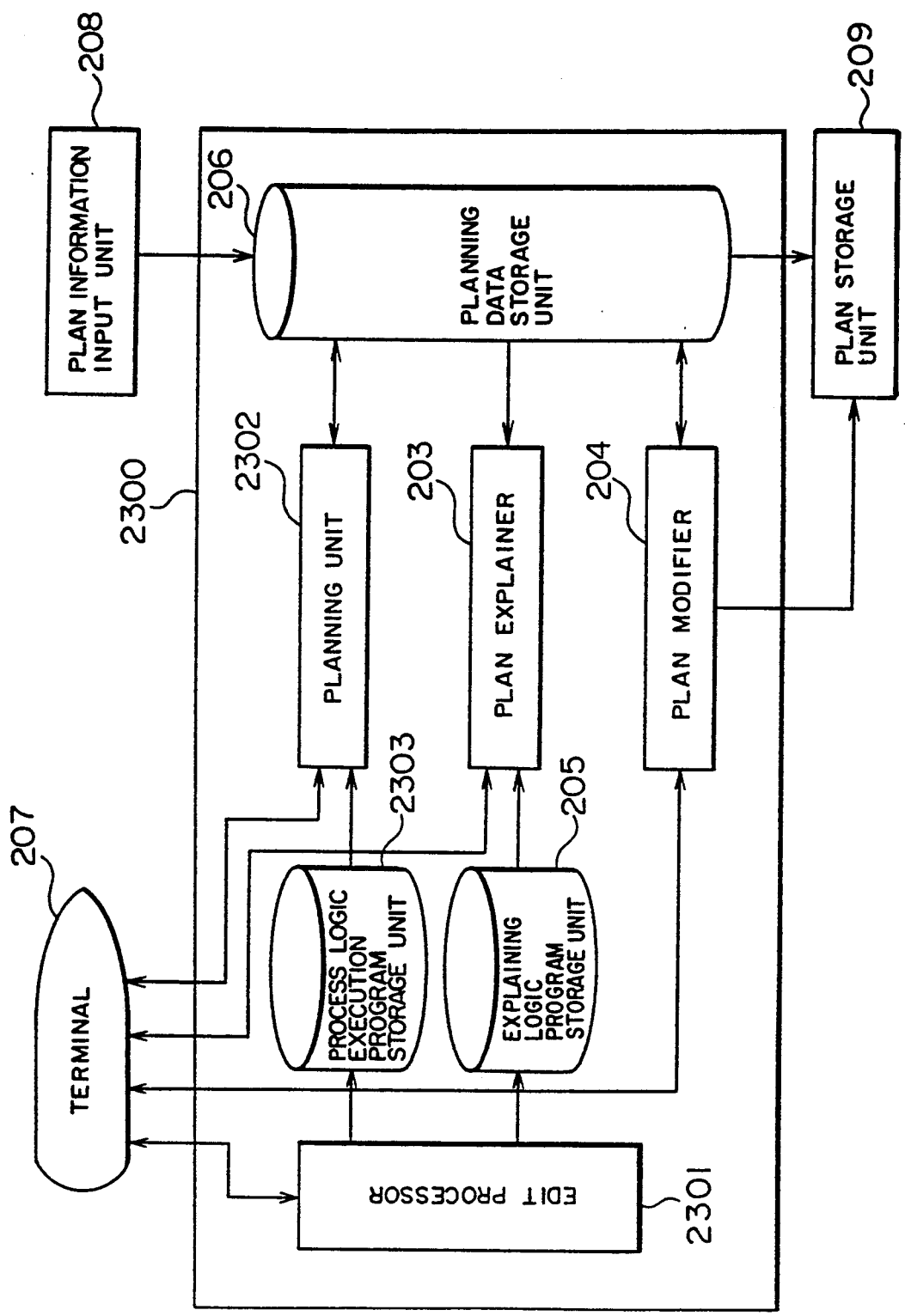
FIG. 23 is a block diagram showing how functional blocks are related to a table in a planning support system according to a fourth embodiment of the invention.

A planning support system according to a fourth embodiment of the invention will now be described by mainly referring to FIG. 23 showing how functional blocks are related to a table.

In the fourth embodiment of the present invention, the calculation equations (business logic) are also used as the calculation equations for the explanating statement.

The planning support system of this embodiment, designated by reference numeral 2300, includes an edit processing unit 2301, a planning unit 2302, a plan explainer unit 203, a plan modifier unit 204, an explaining logic program storage unit 205, a process logic program storage unit 2303, a planning process data storage unit 103, a terminal 207, a plan input unit 208, and a plan storage unit 209. The planning process data storage unit 103 is the same as that of the first embodiment, and the plan explainer 203, plan modifier 204, explaining logic program storage unit 205, terminal 207, plan input unit 208 and plan storage unit 209 are the same as those of the second embodiment.

Figure 24:
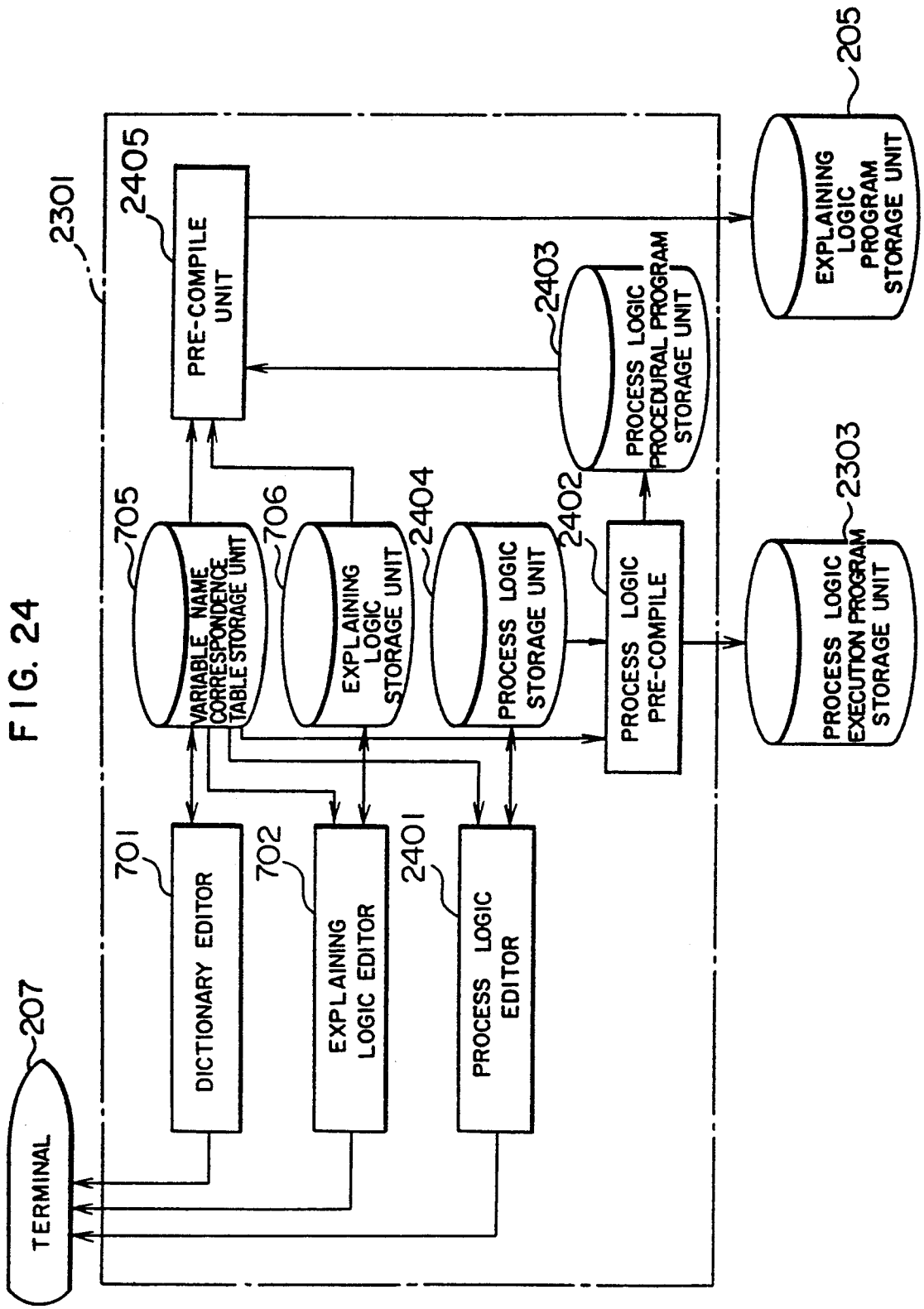
FIG. 24 is a block diagram showing how functional blocks are related to a table in an edit processing unit 2301.

FIG. 24 shows how functional blocks are related to a table in the edit processor 2301. The edit processor 2301 corresponds to the edit processor 202 in the second embodiment and it substitutes a process logic edit unit 2401 and a plan logic source program storage unit 2403 for the calculation logic editor 703 and calculation logic source program 707 and additionally includes a process logic pre-compile unit 2402 and the process logic storage unit 2404.

Responsive to an edit request inputted from the terminal 207, the process logic editor 2401 receives and changes a process logic stored in a business logic storage unit 2403 under the direction of the terminal 207. The editor 2401 also operates to analyze a sentence structure of the changed explaining logic, check the sentence structure and in the presence of an error, display the contents of the error on the terminal 207. The process logic referred to herein is data which defines logics (process logics) used for planning, by using unfamiliar variable names such as technical terminology used by persons in charge of planning or Japanese language. FIG. 25 shows an example of the process logic for calculating process times by which individual lots are processed with individual apparatus in, for example, process planning business.

The process logic pre-compiler 2402 converts the process logic in the process logic storage unit 2402 into a program executable by the computer and stores the program into a process logic execution program storage unit 2303.

Figure 26:
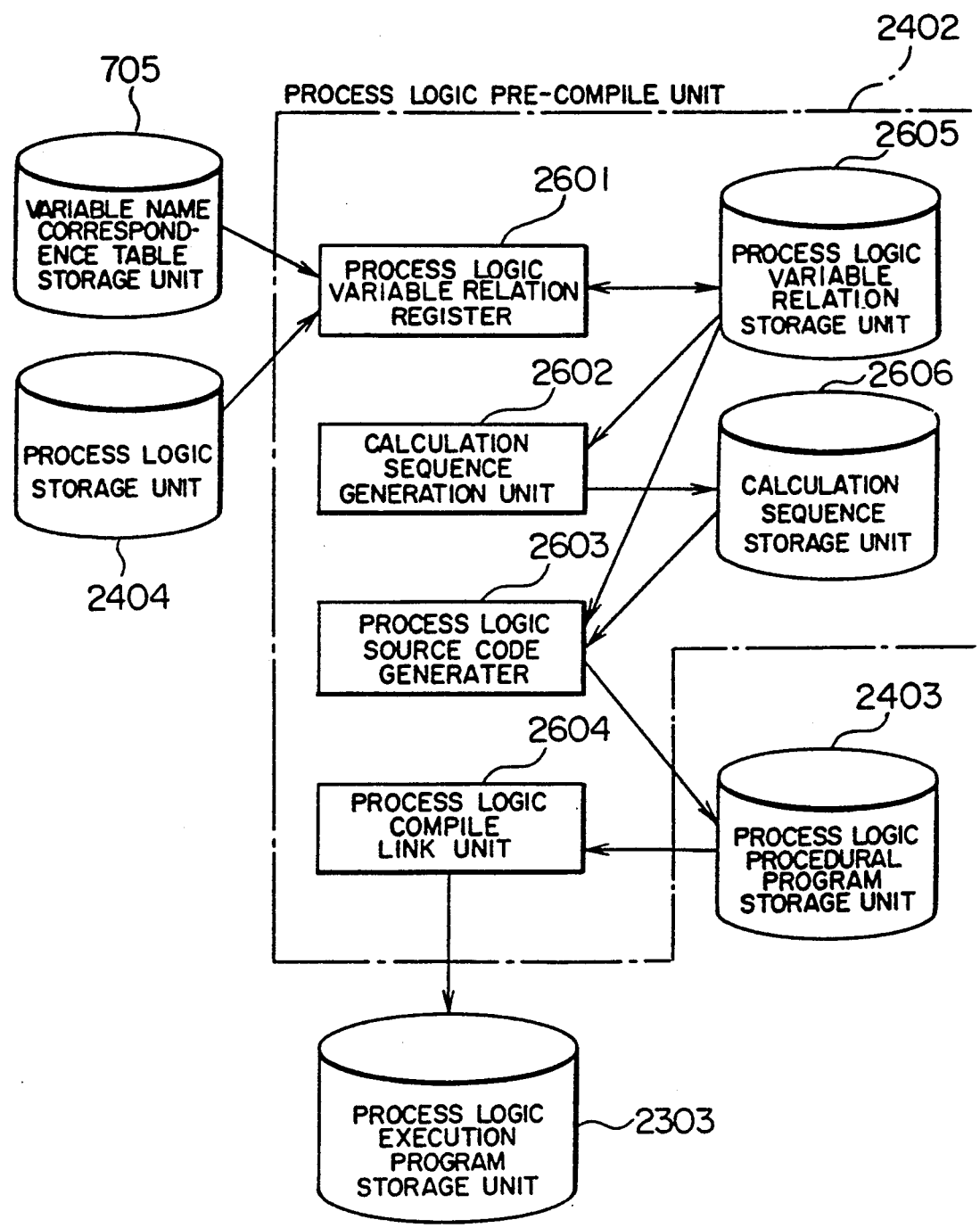
FIG. 26 is a block diagram showing how functional blocks are related to a table in a process logic pre-compile unit 2403.

FIG. 26 shows how functional blocks are related to a table in the process logic pre-compile unit 2403. As illustrated, the pre-compiler 2403 includes a variable relation register unit 2601, a calculation sequence generation unit 2602, a source code generator unit 2603, a compile link unit 2604, a process logic variable relation storage unit 2605, a calculation sequence storage unit 2606 and a process logic procedural program storage unit 2607. The process logic variable relation storage unit 2607 has the same data structure as that of the second embodiment and stores a correspondence table of Japanese technical term and English code name corresponding to variable's names included in the process logic.

When the contents of the process logic storage unit 2043 or variable name correspondence table storage unit 705 is renewed, the process logic pre-compiler 2402 is operated to activate the process logic variable relation register 2601, calculation sequence generation unit 2602, process logic source code generator 2603 and process logic compile link unit 2604 sequentially.

The process logic variable relation register 2601 stores affixes such as x, y and z described in the "for" statement of the process logic and Japanese technical terms corresponding to the affixes in the affix registration table, obtains English code names corresponding to the Japanese technical terms of the affixes from the variable name correspondence table 705 and stores the English code names in the affix registration table. Variables cut out by wording analysis are registered in the variable registration table. English code names corresponding to affixes of Japanese technical terms are derived from the affix registration table and stored in the variable registration table 1402.

The calculation sequence controller 2602 responds to a statement in the logic part of the process logic and the contents of the process logic variable relation storage unit 2605 to prepare the calculation sequence and store it in the calculation sequence storage unit 2506.

The process logic source code generator 2603 receives the contents of the process logic variable relation register 2605 and calculation sequence storage unit 2606 and uses the English code name in the process logic variable relation register 2605 to prepare a procedural program complying with a language specification of the process logic compile link unit 2604 and store the procedural program in the process logic procedural program storage unit 2403. In the example of the process logic shown in FIG. 25, a procedural program of FIG. 11, for example, is generated.

The process logic compile link unit 2604 receives the procedural program from the process logic procedural program storage unit 2607, converts the procedural program into a program executable directly by the computer and stores it in the process logic program 2303.

The planning unit 2302 utilizes the program in the process logic execution program storage unit 2303 to prepare a plan and stores the results in the planning data storage unit 103.

The pre-compile unit 2403 essentially resembles the first embodiment but the compile link unit performs a different processing wherein the procedural programs of the explaining logic source program storage unit 1208 and process logic procedural program storage unit 2302 are received and converted into programs executable directly by the computer, the converted programs being stored in the explaining logic program 205.

According to the present embodiment, the logic used for planning can be described in technical terminology familiar with persons in charge of planning or Japanese language and therefore the user having a full understanding of Japanese language can easily deal with changing the planning logics to advantage. Further, by utilizing the process logic used for above planning for calculation logic description in the explaining logic, the explaining logic can easily be prepared without assistance of knowledge of computers to advantage.

Figure 27:
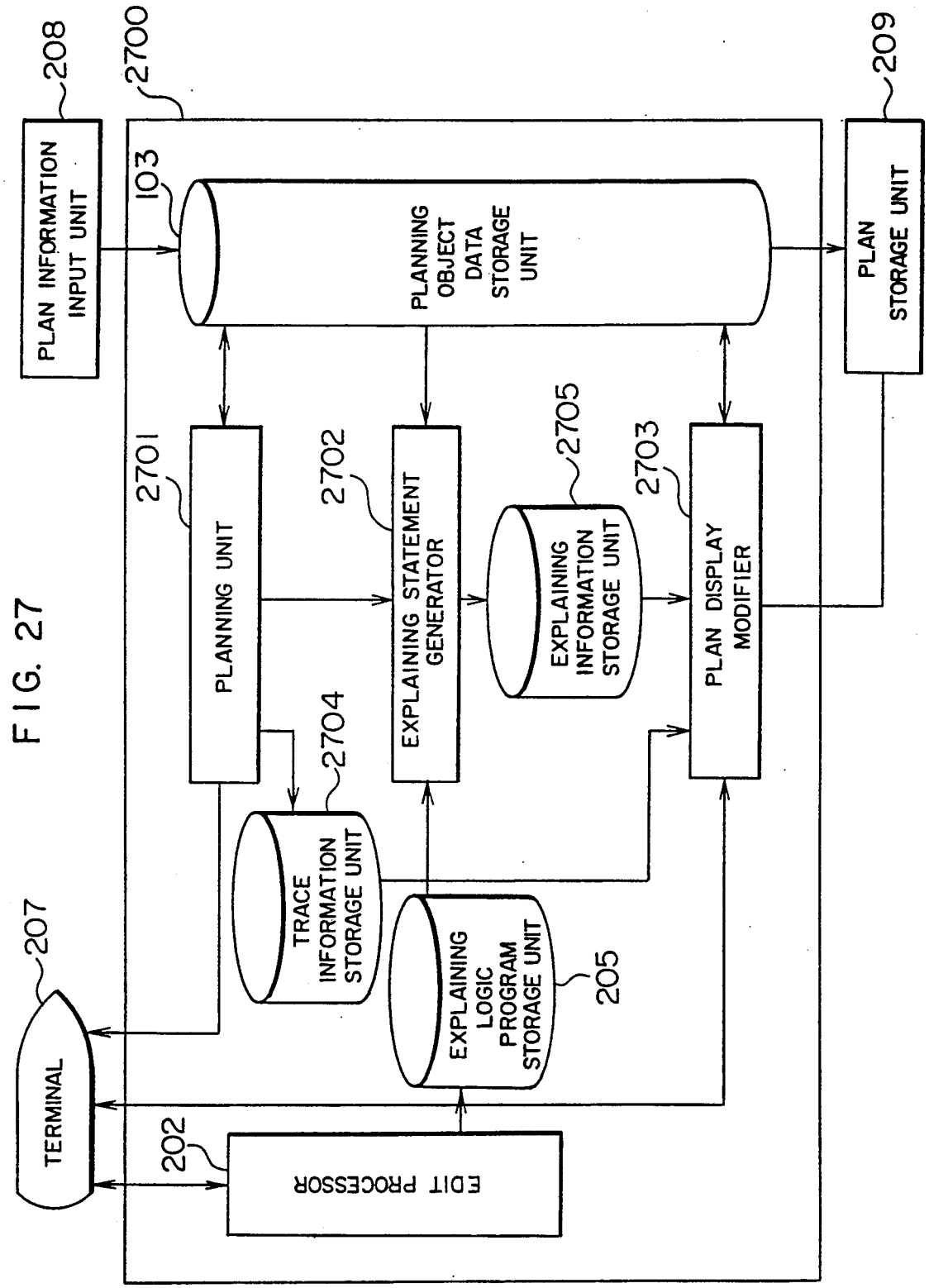
FIG. 27 is a block diagram showing how functional blocks are related to a table in a planning support system according to a fifth embodiment of the invention.

A planning support system according to a fifth embodiment of the invention will now be described by mainly referring to FIG. 27 showing how functional blocks are related to a table.

In the fifth embodiment of the present invention, a trace information in the planning process and the explanating information are outputted.

The planning support system of this embodiment, designated by reference numeral 2700, includes an edit processing unit 202, a planning unit 2701, a explaining statement generator unit 2702, a plan display modifier unit 2703, an explaining logic program storage unit 205, a trace information storage unit 2704, an explaining information storage unit 2705, a planning process data storage unit 103, a terminal 207, a plan input unit 208 and a plan storage unit 209. The planning data storage unit 103 is the same as that of the first embodiment, and the edit processor 202, explaining logic program storage unit 205, terminal 207, plan input unit 208 and plan storage unit 209 are the same as those of the second embodiment.

When started through the terminal 207, the planning unit 2701 prepares a plan on the basis of object data in the planning data storage unit 103 and stores prepared plan data in the planning data storage unit 103. Each time the planning step is executed, execution information is stored in the trace information storage unit 2704. For example, in the planning step, a certain job is discributed or allotted to a certain apparatus. Each time the planning step is executed, the execution information (for example, allotted job and designated apparatus) is sent to the explaining statement generator 2702.

When receiving execution information from the planning unit 2701, the explaining statement generator 2702 executes a program stored in the explaining logic program storage unit 205 and stores the results in the explaining information storage unit 2705.

Figure 31:
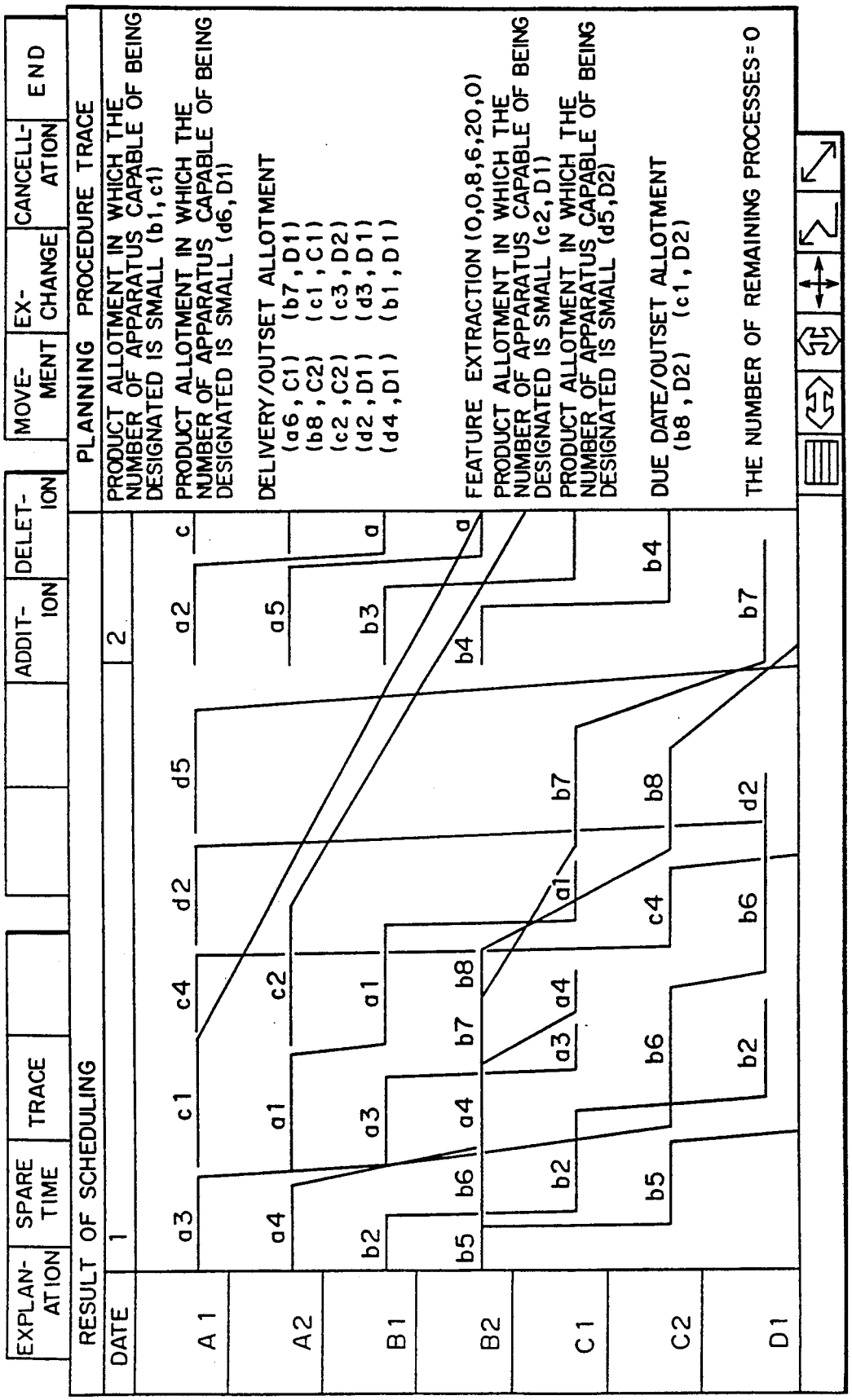
FIG. 31 is a diagram showing an example of display of trace information data.

When started through the terminal 207, the plan display modifier 2703 responds to a request of the end user to display the contents of the trace information storage unit 2704 and explaining information storage unit 2705. FIG. 31 shows an example of display of the trace information.

The modifier 2703 also performs a processing for modifying the planning data in the planning data storage unit 103 and/or storing as eventual data the planning data in the planning data storage unit 103 into the plan storage unit 209.

According to the present embodiment, the planning step can advantageously be grasped accurately and in detail.

Figure 28:
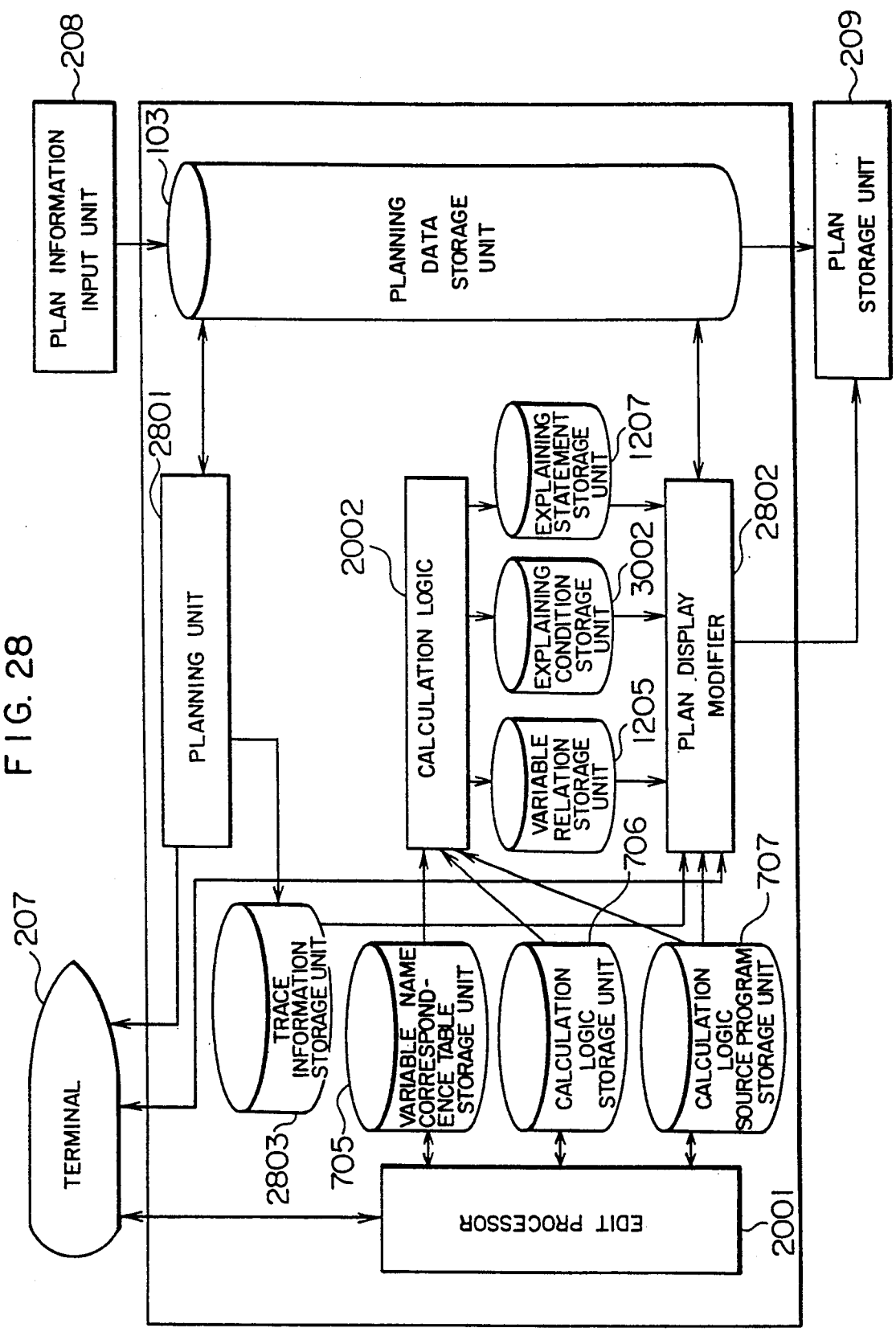
FIG. 28 is a block diagram showing how functional blocks are related to a table in a planning support system according to a sixth embodiment of the invention.

A planning support system according to a sixth embodiment of the invention will now be described by mainly referring to FIG. 28 showing how functional blocks are related to a table.

The planning support system of this embodiment, designated by reference numeral 2800, includes a planning unit 2801, an edit processing unit 2001, an explaining logic analysis unit 2002, a plan display modifier unit 2802, a variable name correspondence table storage unit 705, an explaining logic storage unit 706, a calculation logic source program storage unit 707, a variable relation storage unit 1205, an explaining condition storage unit 3002, an explaining statement storage unit 1207, a planning object data storage unit 103, a trace information storage unit 2803, a terminal 207, a plan input unit 208 and a plan storage unit 209. The planning object data storage unit 103 is the same as that of the first embodiment, and the edit processor 2001, explaining logic analyzer 2002, variable name correspondence table storage unit 705, explaining logic storage unit 706, variable relation storage unit 1205, explaining statement storage unit 1207, terminal 207, plan input unit 208 and plan storage unit 209 are the same as those of the third embodiment.

When started through the terminal 207, the planning unit 2801 prepares a plan on the basis of process data in the planning data storage unit 103 and stores the prepared plan data in the planning data storage unit 103. Each time that the planning step is executed, execution information is stored in the trace information storage unit 2803.

In the present embodiment, an explaining statement name to be displayed when the explaining statement selection condition stands and a program name to be started when the explaining statement selection condition stands may be described in the description in the logic part of the explaining logic. FIG. 29 shows an example of description of the aforementioned explaining logic. In FIG. 29, an English name parenthesized by ( ) after call is a program name started when the explaining statement selection condition stands. In the present embodiment, the started program name is defined by a Japanese language name, and an English program name corresponding to the Japanese program name is registered in advance in the variable name correspondence table storage unit 705. In the present embodiment, a restriction violating state is described in the explaining selection condition and a violation cancellation program is designated as a program to be started. The explanation selection condition is stored in the explaining condition storage unit 3002 in a format as shown in FIG. 30.

The plan display modifier 2802 responds to a request of the end user through the terminal 207 to prepare and display an explaining statement and modify display and planning of the trace information. For preparation and display of the explaining statement, an operation similar to that performed by the plan explainer unit 2003 of the second embodiment is carried out. Display of the trace information is effected on the basis of the information in the trace information storage unit 2704 to display trace information data as shown in FIG. 31, as in the case of the fifth embodiment. The plan can be modified through an operation similar to that performed by the plan modifier 204 of the third embodiment. If there is a violation of the restriction in the result of the plan, the explaining statement indicated by the explaining logic is outputted and then a violation cancelling program is executed upon receiving instruction from the end user so as to modify the result of planning.

According to the present embodiment, since an initial plan can be prepared and the results can be modified, a desired plan satisfying the restriction can advantageously be prepared with ease. Further, even when an urgent job is added, a rapid response thereto can be made to advantage.

While in the present embodiment the violation cancellation processing is executed in response to the designation by the end user after completion of the planning processing, the contents of the explaining condition storage unit 3002 may be decided during planning so that the violation cancellation program may be started at the time that the condition is satisfied.

According to the present embodiment, even when the constrained condition violation occurs during planning, the violation cancellation processing can be executed automatically and advantageously the plan results meeting the constrained condition can be obtained.

A seventh embodiment of the invention will now be described.

Figure 33:
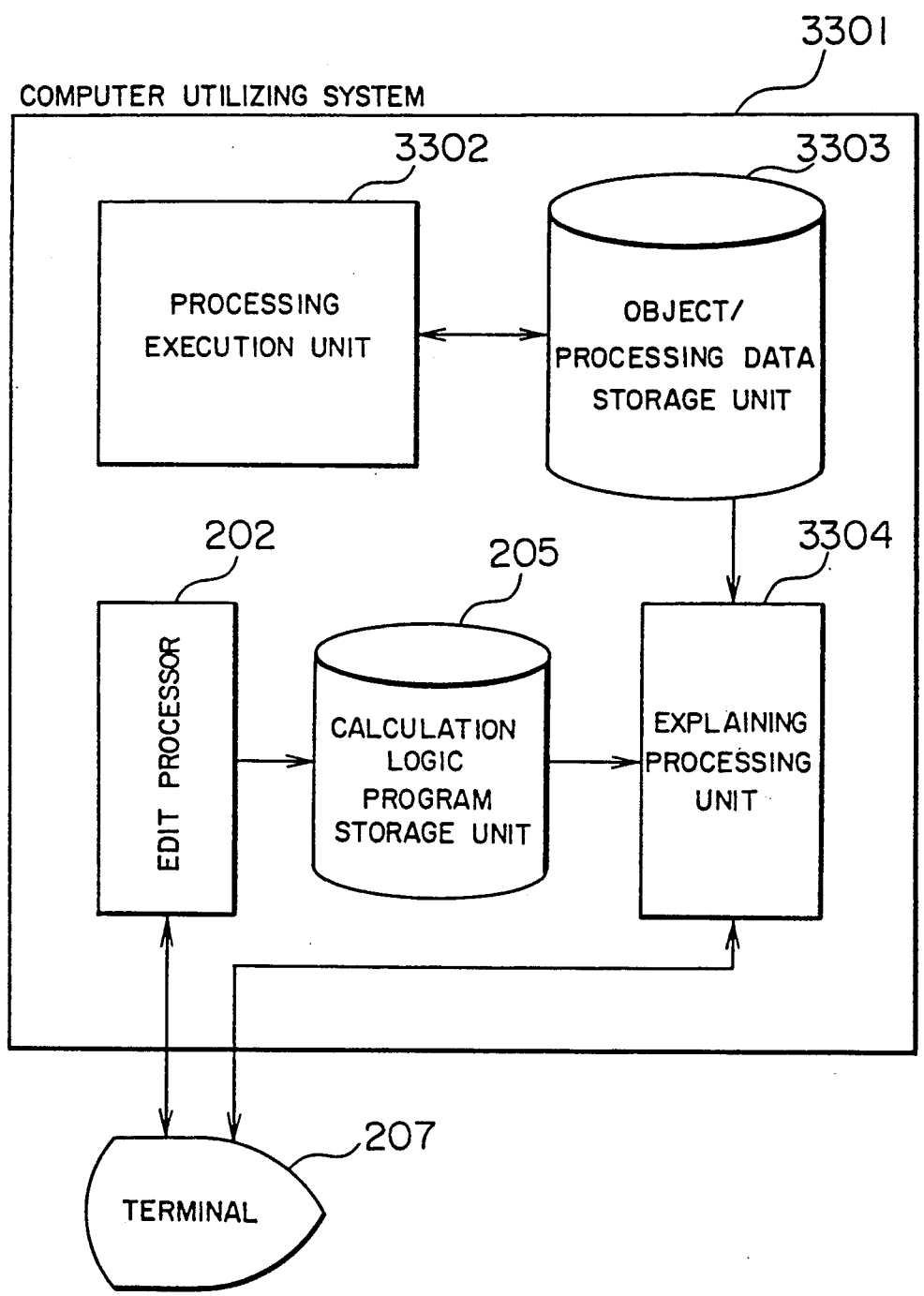
FIG. 33 is a block diagram showing how functional blocks are related to a table in a computer utilizing system 3301 according to a seventh embodiment of the invention.

The seventh embodiment is directed to an application of the present invention to a general computer processing system and will be described with reference to FIG. 33 showing how functional blocks are related to a table.

The computer processing system of this embodiment, designated by reference numeral 3301, includes a processing execution unit 3302, an object/processing data storage unit 3303, an edit processing unit 202, an explaining processing unit 3304, an explaining logic program storage unit 205 and a terminal 207, and the edit processing unit 202, explaining logic program storage unit 205 and terminal 207 are the same as those of the first embodiment.

The processing executor 3302 executes a processing on the basis of object data in the object/processing data storage unit 3302 and stores data of the process procedure and the processing results into the object/processing data storage unit 3302.

The description processor 3304 responds to explaining object information inputted through the terminal 207 and the contents of the object/processing data storage unit 3303 to execute a program in the explaining logic program storage unit 205 so as to display an explaining statement.

According to the present embodiment, the behavior of systems including in general the computer processing system can advantageously be grasped in detail and accurately.

An eighth embodiment of the invention will now be described.

Figure 34:
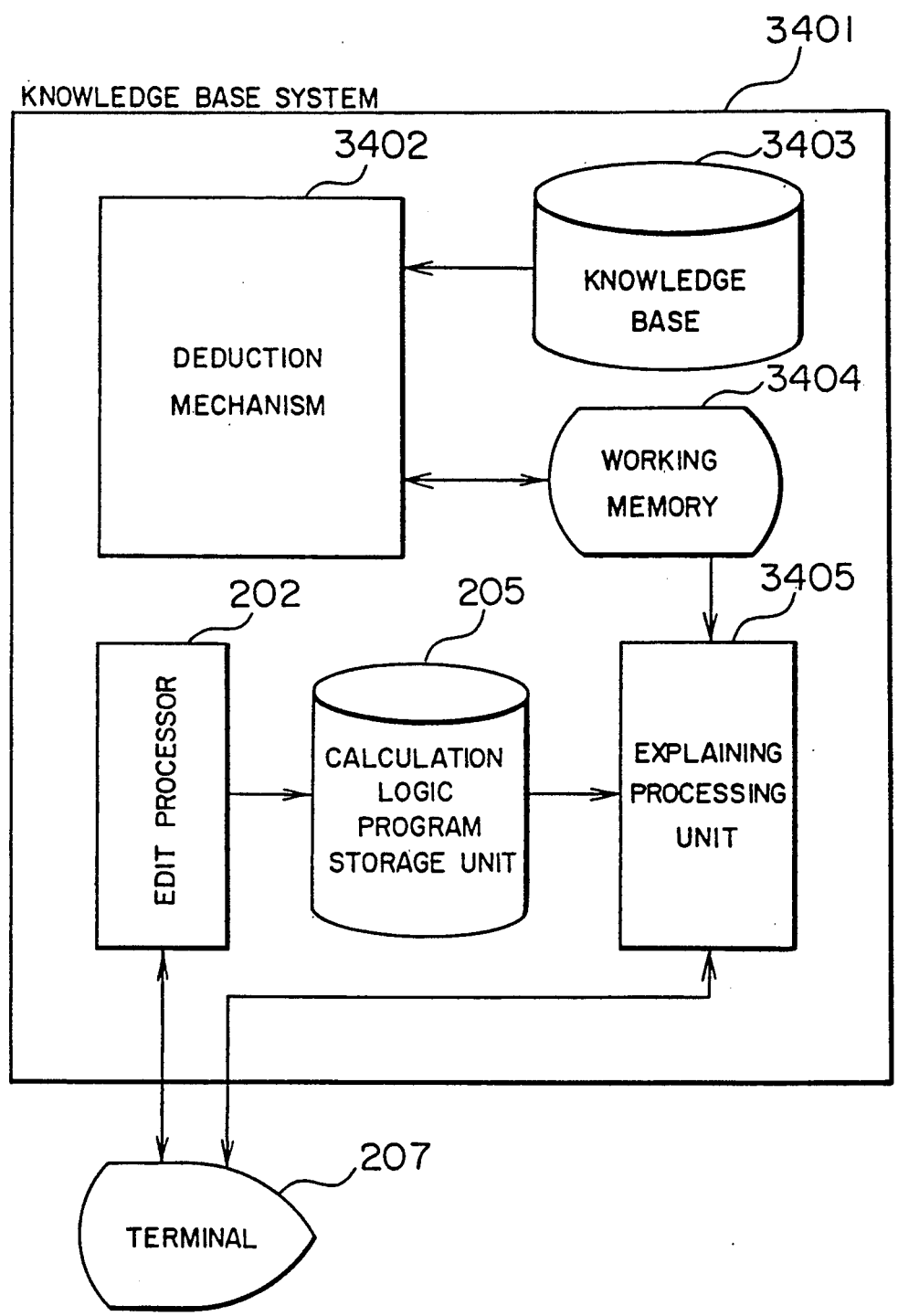
FIG. 34 is a block diagram showing how functional blocks are related to a table in a knowledge base system 3401 according to an eighth embodiment of the invention.

The eighth embodiment is directed to an application of the present invention to a knowledge base system having the deduction function and comprised of a knowledge base and a working memory and will be described with reference to FIG. 34 showing how functional blocks are related to a table.

The knowledge base system of this embodiment, designated by reference numeral 3401, includes a deduction mechanism 3402, a knowledge engineering base 3403, a working memory 3404, an edit processing unit 202, an explaining processing unit 3405, an explaining logic program storage unit 205 and a terminal 207, and the edit processor 202, explaining logic program storage unit 205 and terminal 207 are the same as those of the first embodiment.

The deduction mechanism 3402 executes deduction on the basis of the contents of the knowledge base 3403 and working memory 3404 and stores data of the deduction procedure and the deduction results in the working memory 3404.

The explaining processor 3405 responds to explaining object information inputted through the terminal 207 and information in the working memory 3404 to execute a program in the explaining logic program storage unit 205 and display an explaining statement.

According to the present embodiment, in addition to mere trace information represented by knowledge information executed by the deduction mechanism, persuasible information in the form of an explaining statement can be obtained, thus attaining an advantage that the behavior of the knowledge base system can be grasped in detail and accurately. Further, even if knowledge described in procedural language is stored in the knowledge base, the deduction procedure can advantageously be explained.

A ninth embodiment of the invention will now be described.

Figure 35:
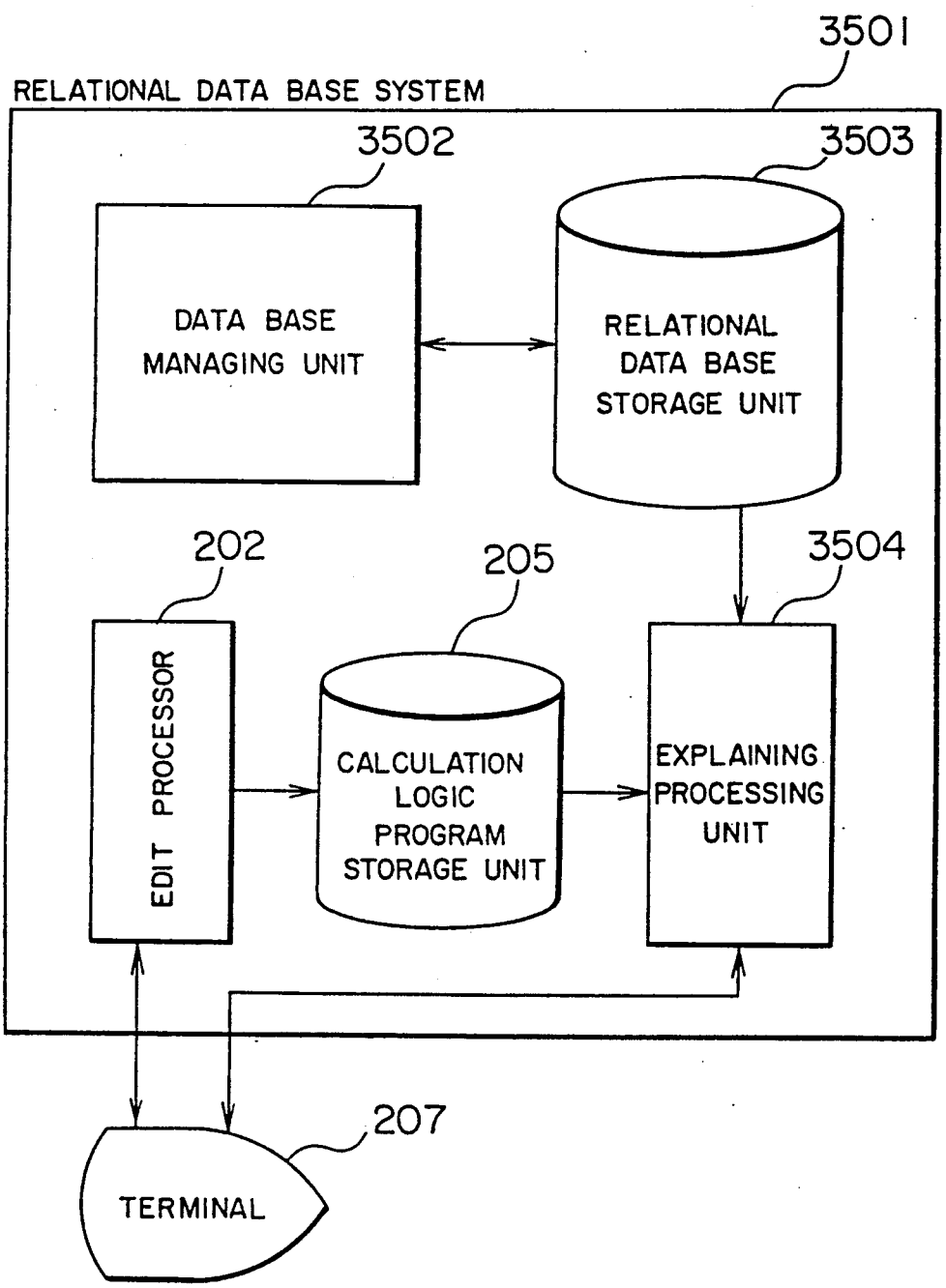
FIG. 35 is a block diagram showing how functional blocks are related to a table in a relational database system 3501 according to a ninth embodiment of the invention.

The ninth embodiment is directed to an application of the present invention to a relational data base system and will be described with reference to FIG. 35 showing how functional blocks are related to a table.

The relational data base system of this statement, designated by reference numeral 3501, includes a data base managing unit 3502, a relational data base storage unit 3503, an edit processing unit 202, an explaining processing unit 3504, an explaining logic program storage unit 205 and a terminal 207, and the edit processor 202, explaining logic program storage unit 205 and terminal 207 are the same as those of the first embodiment.

The data base manager 3502 executes management of input/output and the like of a relational data base in the data base storage unit 3503.

Stored in the relational data base storage unit 3503 is relational data as shown in FIG. 9.

The explanation processor 3504 responds to explaining object information inputted through the terminal 207 and the contents of the relational data base storage unit 3503 to execute a program in the explaining logic program storage unit 205 so as to display an explaining statement.

According to the present embodiment, the structure of complicated relational data base can be understood easily, thereby facilitating maintenance to advantage.

According to the present invention, grounds for conclusion can be indicated to problems in which various substitutive plans can be conceived when preparing a plan in various kinds of planning business by utilizing a computer, so that the quality of the results can be determined accurately. Further, the prepared plan can be modified as necessary and therefore plans and appropriate plans can be prepared easily.

Moreover, according to the invention, since the explaining logic for expressing various kinds of information in course of planning can be described in Japanese language with ease, the behavior of the system in course of planning can easily be understood without assistance of knowledge of computers.

We claim:

1. A planning support method comprising the steps of:
    storing data standing for an object to be planned, data of planning and data of planning results in a first memory;
    storing in a second memory a variable name correspondence table defining a variable name in data used for planning in terms of terminology specific to one of a planning process and a Japanese language and an English character corresponding thereto;
    storing data of definition of an explaining statement concerning a planning procedure and planning results in a third memory;

storing in a fourth memory a calculation program used for preparing an explanation statement;

preparing a plan on the basis of the contents of said first memory;

preparing an explaining statement concerning said planning on the basis of the contents of said first, second, third and fourth memories including storing a fixed part of the explaining statement stored in said third memory into a fifth memory, determining the variable of a variable part comprising an English code name corresponding to said variable or a program name on the basis of data stored in said second memory, storing a value of the variable of English code name in said fifth memory on a basis of the contents of said first memory when said variable of the variable part is the English code name and when said variable of the variable part is a program name, starting a program corresponding to said program name stored in said fourth memory, and storing a value calculated through said program in said fifth memory whereby the fixed part and the variable are combined to form the explaining statement; and delivering a prepared explaining statement.

2. The planning support method according to claim 1, wherein said delivery step includes a step of storing the prepared explaining statement in a fifth memory.

3. The planning support method according to claim 2, wherein said step of storage into said fifth memory includes a step of displaying the stored explaining statement in accordance with a request from a user.

4. The planning support method according to claim 1, wherein stored in said second memory are data indicative of the correspondence relation among variables of English code names used in said step of preparing a plan, attributes comprising character type and integer type of an English code name corresponding to the variables, regions of the attributes and variable names in terms of the terminology specific to planning process or Japanese language and corresponding to said English code names, and a program name for calculating a variable undefined in the definition data of the explaining statement stored in said third memory.

5. The planning support method according to claim 1, wherein said third memory stores a statement defining an output form comprised of the fixed part and the variable part of the explaining statement concerning a planning procedure and planning results, and a variable name in terms of either terminology specific to planning process or Japanese language stored in said second memory is stored as the variable of the variable part.

6. A planning support system comprising the steps of:

storing data standing for an object to be planned, data in course of planning and data of planning results in a first memory;

storing in a second memory a variable name correspondence table defining a variable name in data used for planning in terms of one of a terminology specific to planning process and Japanese language and an English expression corresponding thereto;

storing in a third memory data of definition of an explaining logic having an explaining statement name for discriminating output form and an explaining statement of a plurality of explaining statements each comprised of a fixed part and a variable part, and an explaining statement selection condition for which explaining statement should be displayed in accordance with conditions;

storing in a fourth memory a calculation program used for preparing an explanation statement;

preparing a plan on the basis of the contents of said first memory;

preparing an explaining statement concerning said planning on the basis of the contents of said first, second, third and fourth memories including deciding first the explaining statement selection condition on the basis of each explaining logic stored in said third memory, storing the fixed part in a fifth memory in an output form of an explaining statement of an explaining statement name corresponding to a valid condition, determining a variable of a variable part from an English code name corresponding to said variable or a program name on the basis of data stored in said second memory, storing in said fifth memory a value of said variable English code name on the basis of the contents of said first memory, starting a program of a program name stored in said fourth memory when said variable is the program name, and storing a value calculated through said program in said fifth memory whereby the fixed part and the value are combined to form the explaining statement; and delivering a prepared explaining statement.

7. The planning support method according to claim 6, wherein said delivery step includes a step of storing the prepared explaining statement in a fifth memory.

8. The planning support method according to claim 7, wherein said delivery step includes a step of displaying the explaining statement stored in said fifth memory in accordance with a request from a user.

9. A planning support method comprising the steps of:

storing data standing for an object to be planned, data in course of planning and data of planning results in a first memory;

storing in a second memory a variable name correspondence table defining a variable name in data used for planning in terms of one of a terminology specific to one of a planning process and a Japanese language and an English expression corresponding thereto;

storing in a third memory data of definition of an explaining logic having an explaining statement name for discriminating output form and an explanation of a plurality of explaining statements each comprised of a fixed part and a variable part, and an explaining statement selection condition for which a selected explaining statement is displayed;

storing in a fourth memory a plan program used for preparing an explaining statement;

preparing a plan on the basis of the contents of said first memory;

converting the definition data of the explaining logic into a program suitable for a computer on the basis of the contents of said second, third and fourth memories to generate a program for preparing an explaining statement;

executing the program for preparing the explaining statement to prepare the explaining statement;

delivering the prepared explaining statement; and displaying and editing contents of the memories selected by an operator.

10. The planning support method according to claim 9, wherein said delivery step includes a step of displaying the prepared explaining statement.

11. The planning support method according to claim 9, wherein said step of executing includes analyzing a sentence structure of the output form of each explaining statement in respect of each explaining statement name on the basis of the explaining logic stored in said third memory, determining a variable of the variable part by determining an English code name corresponding to said variable on the basis of the data stored in said second memory, preparing a program for delivery of said explaining statement, assigning an English program name to said program, analyzing a sentence structure of an explaining statement selection condition statement described in said explaining logic, determining a variable by determining an English code name corresponding to the variable and a program name corresponding to the explaining statement displayed when said selection condition is satisfied on the basis of the data stored in said second memory, and preparing a program step of the explaining statement selection condition.

12. The planning support method according to claim 9, wherein said step of executing includes a step of storing a process logic standing for a logic concerning planning a sixth memory.

13. The planning support method according to claim 12, wherein said step of storage into said sixth memory includes a step of storing a statement defining calculation formula and procedure for planning, and storing data present in said second memory which is a variable name described in the terms of either terminology specific to planning process or Japanese language.

14. The planning support method according to claim 12, wherein said step of displaying and editing contents of said memories includes checking a syntax of the process logic with an edit function.

15. The planning support method according to claim 9, wherein said step of preparing a plan includes a step of converting the process logic stored in said sixth memory into a program suitable for a computer.

16. The planning support method according to claim 15, wherein the step of converting said process logic into a program suitable for a computer and preparing said plan by utilizing the converted program includes a step of converting the explaining logic into a program suitable for the computer.

17. The planning method according to claim 9, wherein said step of preparing a plan includes a step of preparing a plan by utilizing a program converted from the process logics stored in said first and sixth memories.

18. The planning support method according to claim 9, wherein in said step of converting, the explaining logic data defining the logic for preparation of an explaining statement concerning processing of said program is converted into a program suitable for a computer on the basis of variable name correspondence table defining unfamiliar names including Japanese language or a terminology specific to process standing for an object of said program to prepare a program executable directly by a computer.

19. The planning support method according to claim 9, wherein in said step of displaying and editing the contents of said memories, information on variables stored in said second memory and relation between the variables can be displayed in table form or tree form, and are displayed and edited in any one of the forms in accordance with a request by a user.

20. The planning support method according to claim 9, wherein said step of displaying and editing contents of said memories includes checking a syntax of the explaining logic with an edit function.

21. The planning support method according to claim 9, wherein in said step of storage into said first memory, said object data, data in course of planning and planning result database are stored in relational data form.

* * * * *

UNITED STATES PATENT AND TRADEMARK OFFICE
CERTIFICATE OF CORRECTION

PATENT NO. : 5,303,147
DATED : April 12, 1994
INVENTOR(S) : Michiko Oba, et al.

It is certified that error appears in the above-indentified patent and that said Letters Patent is hereby corrected as shown below:

Claim 6, column 19, line 58, delete "one of a"; and,
line 59, before "planning" insert --one of a--.

Column 20, line 13, after "of" delete "a" and insert --the--.

Claim 9, column 20, line 40, delete "one of a".

Claim 17, column 22, line 9, after "planning" insert --support--.

Signed and Sealed this

Sixth Day of September, 1994

Attest:

BRUCE LEHMAN

Attesting Officer

Commissioner of Patents and Trademarks